(12) United States Patent
Grant et al.

(10) Patent No.: US 12,108,454 B2
(45) Date of Patent: *Oct. 1, 2024

(54) RATE MATCHING FOR WIDEBAND CARRIER OPERATION IN NR-U

(71) Applicant: TELEFONAKTIEBOLAGET LM ERICSSON (PUBL), Stockholm (SE)

(72) Inventors: Stephen Grant, Santa Clara, CA (US); Reem Karaki, Herzogenrath (DE); Peter Alriksson, Lund (SE); Tai Do, Lund (SE); Jung-Fu Cheng, Santa Clara, CA (US); Havish Koorapaty, Santa Clara, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/195,345

(22) Filed: May 9, 2023

(65) Prior Publication Data
US 2023/0276498 A1 Aug. 31, 2023

Related U.S. Application Data

(63) Continuation of application No. 17/279,876, filed as application No. PCT/IB2019/058272 on Sep. 30, 2019, now Pat. No. 11,659,594.

(Continued)

(51) Int. Cl.
*H04L 1/00* (2006.01)
*H04L 27/26* (2006.01)
*H04W 72/044* (2023.01)
*H04W 74/00* (2009.01)

(Continued)

(52) U.S. Cl.
CPC ....... *H04W 74/0816* (2013.01); *H04L 1/0068* (2013.01); *H04L 27/2607* (2013.01); *H04W 72/044* (2013.01); *H04W 74/002* (2013.01)

(58) Field of Classification Search
None
See application file for complete search history.

(56) References Cited

U.S. PATENT DOCUMENTS

| 2014/0194133 | A1* | 7/2014 | Darwood | H04L 5/0037 455/450 |
| 2017/0118728 | A1* | 4/2017 | Harada | H04W 72/23 |
| 2021/0400722 | A1 | 12/2021 | Grant et al. | |

FOREIGN PATENT DOCUMENTS

| WO | 2018081913 A1 | 5/2018 |
| WO | 2020063586 A1 | 4/2020 |

OTHER PUBLICATIONS

Huawei et al., "NR numerology and frame structure for unlicensed bands", 3GPP TSG-RAN WG1 Meeting #94, Gothenburg, Sweden, Aug. 20-24, 2018, pp. 1-10, R1-1808058, 3GPP.

(Continued)

*Primary Examiner* — Hong Shao

(57) ABSTRACT

An example method is performed by a wireless device in a wireless communication network. The method comprises receiving, from a base station, a control message allocating resources in a bandwidth part for a downlink transmission, the bandwidth part including unlicensed spectrum and being divided into a plurality of bandwidth pieces corresponding to bandwidth units over which listen-before-talk (LBT) is performed. The radio resources used for the downlink transmissions exclude (e.g., by puncturing or rate-matching around) one or more guard bands of a bandwidth piece that is sensed as free for transmission.

14 Claims, 20 Drawing Sheets

Related U.S. Application Data

(60) Provisional application No. 62/739,086, filed on Sep. 28, 2018.

(51) Int. Cl.
    *H04W 74/08*     (2024.01)
    *H04W 74/0816*     (2024.01)

(56) References Cited

OTHER PUBLICATIONS

Ericsson, "Discussions on wideband operation and bandwidth part", 3GPP TSG-RAN WG2 #103-Bis, Chengdu, China, Oct. 8-12, 2018, pp. 1-3, TDoc R2-1815031, 3GPP.

Ericsson, "Frame structure for NR-U", 3GPP TSG-RAN WG1 Meeting #94, Gothenburg, Sweden, Aug. 20-24, 2018, pp. 1-7, R1-1809201, 3GPP.

Ericsson, "On different carrier BW in 5GHz NR-U operation". 3GPP TSG RAN WG4 #88bis, Chengdu, China, Oct. 8-12, 2018, pp. 1-3, R4-1813353, 3GPP.

Oppo, "DL design for NR-U", 3GPP TSG-RAN WG1 Meeting #94, Gothenburg, Sweden, Aug. 20-24, 2018, pp. 1-4, R1-1808897, 3GPP.

Oppo, "UL design for NR-U", 3GPP TSG-RAN WG1 Meeting #94, Gothenburg, Sweden, Aug. 20-24, 2018, pp. 1-4, R1-1808898, 3GPP.

Samsung, "Signaling to support bandwidth part", 3GPP TSG-RAN WG2 NR #99bis Meeting, Prague, Czech, Oct. 9-13, 2017, pp. 1-7, R2-1711188, 3GPP.

\* cited by examiner

RATE MATCHING FOR WIDEBAND CARRIER OPERATION IN NR-U

PRIORITY

This nonprovisional application is a continuation of U.S. application Ser. No. 17/279,876, filed Mar. 25, 2021, which is a U.S. National Stage Filing under 35 U.S.C. § 371 of International Patent Application Serial No. PCT/IB2019/058272, filed Sep. 30, 2019, and entitled "Rate Matching for Wideband Carrier Operation in NR-U" which claims priority to U.S. Provisional Patent Application No. 62/739,086, filed Sep. 28, 2018, all of which are hereby incorporated by reference in their entirety.

TECHNICAL FIELD

The disclosed subject matter relates generally to telecommunications and more particularly to adapting data transmissions in unlicensed spectrum channels of a next generation mobile wireless communication system.

BACKGROUND

Mobile broadband will continue to drive the demands for large overall traffic capacity and huge achievable end-user data rates in the wireless access network. Several scenarios in the future will require data rates of up to 10 Gbps in local areas. These demands for very high system capacity and very high end-user date rates can be met by networks with distances between access nodes ranging from a few meters in indoor deployments up to roughly 50 m in outdoor deployments, i.e. with an infra-structure density considerably higher than the densest networks of today. We refer to such networks as NR systems in the following which is currently being developed in 3GPP now. Besides traditional licensed exclusive bands, NR systems are also expected to be operating on unlicensed bands especially for enterprise solutions. This is currently being discussed within the NR-U study item in 3GPP.

For background purposes, some of the key aspects of LTE are described in this section. Of particular relevance is the transport block processing and use of unlicensed bandwidth in LTE and LTE-eLAA. A transmission scheme for use with unlicensed spectrum is being designed also for NR-U, and is the subject of the present application.

Note that terminology used here such as gNodeB and UE should be considering non-limiting and does in particular not imply a certain hierarchical relation between the two; in general, "UE" could be considered as a first node and "gNodeB" a second node, and these two nodes or devices communicate with each other over some radio channel. Herein, we also focus on wireless transmissions in the downlink, but the invention is equally applicable in the uplink.

Numerology and Bandwidth Consideration for NR

Multiple numerologies are supported in NR. A numerology is defined by sub-carrier spacing and CP overhead. Multiple subcarrier spacings can be derived by scaling a basic subcarrier spacing by an integer $2^n$. The numerology used can be selected independently of the frequency band although it is assumed not to use a very small subcarrier spacing at very high carrier frequencies. Flexible network and UE channel bandwidth is supported.

From a Radio Layer 1 working group (RAN1) specification perspective, maximum channel bandwidth per NR carrier is 400 MHz in Rel-15. Note that all details for channel bandwidth at least up to 100 MHz per NR carrier are to be specified in Rel-15. At least for single numerology case, candidates of the maximum number of subcarriers per NR carrier is 3300 or 6600 in Rel-15 from a RAN1 specification perspective. NR channel designs should consider potential future extension of these parameters in later releases, allowing a Rel-15 UE to have access to an NR network on the same frequency band in later releases.

A subframe duration is fixed to 1 ms and frame length is 10 ms. Scalable numerology should allow at least from 15 kHz to 480 kHz subcarrier spacing. All numerologies with 15 kHz and larger subcarrier spacing, regardless of CP overhead, align on symbol boundaries every 1 ms in NR carrier. More specifically, for the normal CP family, the following is adopted.

For subcarrier spacing of 15 kHz*$2^n$ (n is non-negative integer),
Each symbol length (including CP) of 15 kHz subcarrier spacing equals the sum of the corresponding $2^n$ symbols of the scaled subcarrier spacing.
Other than the first OFDM symbol in every 0.5 ms, all OFDM symbols within 0.5 ms have the same size
The first OFDM symbol in 0.5 ms is longer by 16 $T_s$ (assuming 15 kHz and FFT size of 2048) compared to other OFDM symbols.
16 $T_s$ is used for CP for the first symbol.
For subcarrier spacing of 15 kHz*$2^n$ (n is a negative integer)
Each symbol length (including CP) of the subcarrier spacing equals the sum of the corresponding $2^{-n}$ symbols of 15 kHz.

Transport Blocks, Code Blocks and Code Block Groups

In LTE and NR a transport block is segmented into multiple code blocks if the transport block exceeds a certain size. For error detection each code block as well as the transport block have its own CRC. In LTE the HARQ feedback is based on the decoding status of the transport block, i.e. a single HARQ feedback bit is generated per transport block.

NR supports this operation mode. In addition, NR also supports code block group (CBG) based HARQ feedback. NR code block group operations are illustrated in FIG. 6. Here one or multiple code blocks are grouped into a CBG and one HARQ feedback bit is generated for each CBG. This is useful since only a fraction of the transport blocks needs to be retransmitted if only one or few CBG are in error.

CBG-based feedback can be particular useful for very large transport blocks where a re-transmission of the complete transport block would lead to large overhead if only one or few code blocks are in error. With CBG-based feedback only the code block groups in error can be retransmitted. Another application of CBG-based feedback is preemption where an ongoing transmission is interrupted in favor of a low latency transmission. If the preempting transmission is only of short duration just a few code blocks might be destroyed, favoring again a selective transmission of individual code blocks.

Data Mapping to Radio Resources in NR

After the data is encoded for MIMO transmission, modulation symbols are generated from the encoded data and the modulation symbols are further mapped to the allocated radio resources. In NR, the modulation symbols to radio resource mapping follows the layer->frequency->time order. As with the data mapping rule used for NR in licensed bands, the data mapping is illustrated in FIG. 7 for the case when a wideband carrier for NR-U spans multiple LBT bandwidth pieces (see the sub-section entitled "NR wideband operation" below for a description of LBT bandwidth pieces).

Reserved Resources in NR for Rate-Matching

In Rel-15 NR, it is possible for the gNB to reserve certain time and frequency resources and dynamically indicate in the DCI message whether these resources are to be rate-matched around or not for PDSCH (downlink data) reception. Specifically, for a cell or a bandwidth part, up to four rate matching patterns can be configured via higher layer signaling (radio resource control or RRC signaling). Up to two rate-matching groups can be configured with each group containing a set of rate matching patterns. The union of the RB and symbol level resources for the resource sets within a rate matching group can be signaled to be available or not available for PDSCH reception via the DCI message. The presence and number of bits in the DCI (0 to 2) of this rate matching indicator in the DCI message depends on the number of rate matching groups defined for the bandwidth part or the cell.

Multi-Channel UL Transmission for eLAA (LTE)

The baseline for LAA UL multicarrier operation is the extension of the single carrier operation. The LBT type on each carrier is signaled to the UE via corresponding UL grant. Moreover, a UE that has received UL grants on a set of carriers scheduled with Cat 4 LBT with the same starting point in the subframe on all carriers can switch to a 25 us LBT immediately before transmission on a carrier in the set if Cat 4 LBT has successfully completed on a designated carrier in the set. The UE must select one carrier uniformly randomly among the carriers which were scheduled with Cat 4 LBT as the designated carrier prior to starting the Cat 4 LBT procedure on any of the carriers in the set.

Note that different transport blocks (TB) are generated for each carrier and subframe as shown in FIG. 8 when LBT is successful in multiple channels according to the abovementioned rules. Each carrier has a bandwidth of 20 MHz.

Multi-Channel UL Transmission for Wi-Fi

Unlike eLAA, Wi-Fi (i.e. 802.11n, 802.11ac, etc.) defines new wider channel other than 20 MHz. As shown in FIG. 9, 40 MHz could bring more usable subcarriers than simple aggregation of two 20 MHz. The benefit comes from two aspects: one is guard band decrease and the other is pilot subcarrier overhead savings. So wider channel could bring higher spectrum efficiency.

Before transmitting a 40 MHz frame, a station is responsible for ensuring that the entire 40 MHz channel is clear. Clear-channel assessment is performed on the primary channel according to the well-understood rules for transmission on an 802.11 channel. Even if a device intends to transmit a 40 MHz frame, the slot boundaries and timing are based on access to the primary channel only. The secondary channel must be idle during the priority interframe space before it may be used as part of a 40 MHz transmission. In Wi-Fi, a UE decides when and how to transmit UL data itself based on LBT results, i.e. 20 MHz and 40 MHz transmission.

NR Wideband Operation

Similar to NR, it is expected that NR-U will support transmissions with wide bandwidth, e.g., up to several hundreds of MHz bandwidth. However, there could be different radio technologies with different device's capabilities that simultaneously share the same spectrum, e.g., WiFi. It will be unlikely that a device will sense the channel free over the whole wide bandwidth, especially at high load. Thus, it is beneficial for NR-U to support transmissions with dynamic bandwidth, in which the device can decide which part(s) of the supported bandwidth to use based on its listen-before-talk (LBT) outcome.

Two approaches for the device to use in wideband transmissions are the following:

Mode 1: Carrier aggregation (CA)-based wideband operation analogous to LTE-eLAA

Mode 2: Single wideband carrier operation based on a single active bandwidth part (BWP)

FIG. 10 shows an example of these two modes for an operating bandwidth of 80 MHz. For Mode 1, the UE is configured with four 20 MHz component carriers (CC's) totaling 80 MHz which are activated prior to reception/transmission. For Mode 2, the UE is configured with a single 80 MHz bandwidth part (BWP) which is assumed activated prior to reception/transmission. The notion of bandwidth parts is new to NR; LTE did not include BWPs. As shown in the diagram for Mode 2, the wideband carrier (CC) may be greater than 80 MHz; the BWP is simply the part of this wide band carrier for which the UE is configured for DL and UL transmission/reception.

As is being discussed in 3GPP now, LBT is performed in units of 20 MHz, at least for Mode 1. In other words, LBT is performed on a per-CC (component carrier) basis. Transmission then occurs on each CC that is sensed as free, i.e., unoccupied by a transmission from another node (same or different RAT) as determined by a listen-before-talk (LBT) procedure.

For Mode 2, we assume here that LBT is also performed in units of 20 MHz, and we refer to each unit as an "LBT bandwidth piece" as shown in FIG. 10. An LBT bandwidth piece may also be referred to as an LBT bandwidth, LBT sub-band, sub-band, or physical resource block (PRB) range. Based on the LBT outcome, the device aggregates resources from each free LBT bandwidth piece within the single BWP into a single physical shared channel (SCH) in either UL or DL. FIG. 11 shows one example of the outcome of LBT where LBT fails (medium sensed as "busy") on two of the 4 CCs/bandwidth pieces. Of course other LBT outcomes are possible, e.g., LBT failure on 1 or 3 of the CCs/bandwidth pieces.

In either mode, there is leakage from the transmissions on the used CCs/bandwidth pieces into the adjacent 20 MHz channels. For CA-based operation in LTE-LAA (Mode 1), the Radio performance and protocol aspects working group (RAN4) has defined requirements on the cumulative adjacent channel leakage ratio (CACLR) which are defined on a per-CC basis [1, Section 6.6.2.2]:

The Cumulative Adjacent Channel Leakage power Ratio (CACLR) in a sub-block gap or the Inter RF Bandwidth gap is the ratio of:

a) the sum of the filtered mean power centered on the assigned channel frequencies for the two carriers adjacent to each side of the sub-block gap or the Inter RF Bandwidth gap, and b) the filtered mean power centered on a frequency channel adjacent to one of the respective sub-block edges or Base Station RF Bandwidth edges.

The specification sets a maximum value on the CACLR which accounts for leakage from carriers either side of a transmission gap, e.g., leakage from CC1 and CC3 into CC2 as shown in FIG. 11. From an implementation perspective, the device complies with this requirement by appropriate RF filtering of the transmissions on each CC to limit the leakage into adjacent CC's.

For Mode 2, however, no such leakage requirements between LBT bandwidth pieces of a BWP have yet been defined by RAN4. However, it is clear that such requirements for in-channel (intra-BWP) leakage are needed for this mode of operation. Typically, in order to comply with adjacent channel leakage requirements, guard bands are introduced at the edges of a transmission in order to account for the fact that practical filters have a finite rolloff bandwidth. For the case of Mode 2, such intra-BWP guard bands are illustrated in FIG. 12 on either side of all 4 LBT bandwidth pieces.

As discussed in previous sections, in both NR and LTE, a series of transport block (TB) processing steps are required before a PDSCH or PUSCH transmission can occur on the physical channel. The steps include transport block size (TBS) determination, followed by possible segmentation of the TB into one or more codeblocks or codeblock groups, data encoding, CRC attachment, modulation, layer mapping, and precoding. These steps take time, and thus must be performed in advance of the slot scheduled for PDSCH/PUSCH transmission. Moreover, since LBT procedures are performed just in advance of the scheduled slot, some or all of the TB processing steps must be performed in advance of the LBT procedure as well. Consequently, during TB processing for Mode 2 operation, the transmitting device (gNB or UE) typically assumes that all LBT bandwidth pieces are available for transmission since there is little or no time for TB re-processing to account for one or more LBT bandwidth pieces being unavailable due to LBT failure. This is in contrast to Mode 1 operation where separate TB processing is performed on a per-CC basis, and if one or more CC's is unavailable for transmission, the TB(s) corresponding to those CC(s) are simply dropped prior to transmission.

In 3GPP, it has been discussed that for Mode 2, one way to handle LBT failure on one or more LBT bandwidth pieces without fully re-processing the TB is to puncture or rate-match around the LBT bandwidth pieces that are unavailable due to LBT failure. However, no solution has been discussed on how to handle potential intra-BWP guard bands on either side of the LBT bandwidth pieces (see FIG. 5) that are available due to LBT success.

As discussed above, in both NR and LTE, a series of transport block (TB) processing steps are required before a PDSCH or PUSCH transmission can occur on the physical channel. The steps include transport block size (TBS) determination, followed by possible segmentation of the TB into one or more codeblocks or codeblock groups, data encoding, CRC attachment, modulation, layer mapping, and precoding. These steps take time, and thus must be performed in advance of the slot scheduled for PDSCH/PUSCH transmission. Moreover, since LBT procedures are performed just in advance of the scheduled slot, some or all of the TB processing steps must be performed in advance of the LBT procedure as well. Consequently, during TB processing for Mode 2 operation, the transmitting device (gNB or UE) typically assumes that all LBT bandwidth pieces are available for transmission since there is little or no time for TB re-processing to account for one or more LBT bandwidth pieces being unavailable due to LBT failure. This is in contrast to Mode 1 operation where separate TB processing is performed on a per-CC basis, and if one or more CC's is unavailable for transmission, the TB(s) corresponding to those CC(s) are simply dropped prior to transmission.

In 3GPP, it has been discussed that for Mode 2, one way to handle LBT failure on one or more LBT bandwidth pieces without fully re-processing the TB is to puncture or rate-match around the LBT bandwidth pieces that are unavailable due to LBT failure. However, no solution has been discussed on how to handle potential intra-BWP guardbands on either side of the LBT bandwidth pieces (see FIG. 12) that are available due to LBT success.

SUMMARY

According to one embodiment, the wideband data transmissions on a shared channel (e.g., PDSCH in DL or PUSCH in UL) are either punctured or rate-matched around one or more of the guard bands of LBT bandwidth piece(s) for which the channel is sensed as free. The LBT bandwidth pieces span a bandwidth part (BWP) that is in unlicensed spectrum.

Certain embodiments of the present disclosure may provide one or more technical advantages. For example, certain embodiments, in which the puncturing or rate-matching is performed to preserve guard bands of LBT bandwidth pieces, advantageously facilitate efficient data transmissions and/or retransmissions on a wideband unlicensed carrier when a bandwidth part (BWP), e.g., 80 MHz, of a single wideband unlicensed carrier spans multiple LBT bandwidth pieces (e.g., 20 MHz bandwidth), while simultaneously minimizing adjacent channel leakage into adjacent 20 MHz channels.

According to another embodiment, a transport block (TB) may be prepared for transmission with the assumption that only one LBT bandwidth piece is available for a first number of OFDM symbols. Then, depending on how many LBT bandwidth pieces are determined to be available based on an LBT outcome, the TB is transmitted over the multiple available LBT bandwidth pieces over a second (fewer) number of OFDM symbols. Advantageously, the number of available radio resources is the same for all possible LBT outcomes so the TB is more likely to be received correctly compared to embodiments in which puncturing or rate matching around unavailable bandwidth pieces is implemented.

Other advantages may be readily apparent to one having skill in the art. Certain embodiments may have none, some, or all of the recited advantages.

Additional information regarding the various embodiments described herein is provided in Appendix A.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
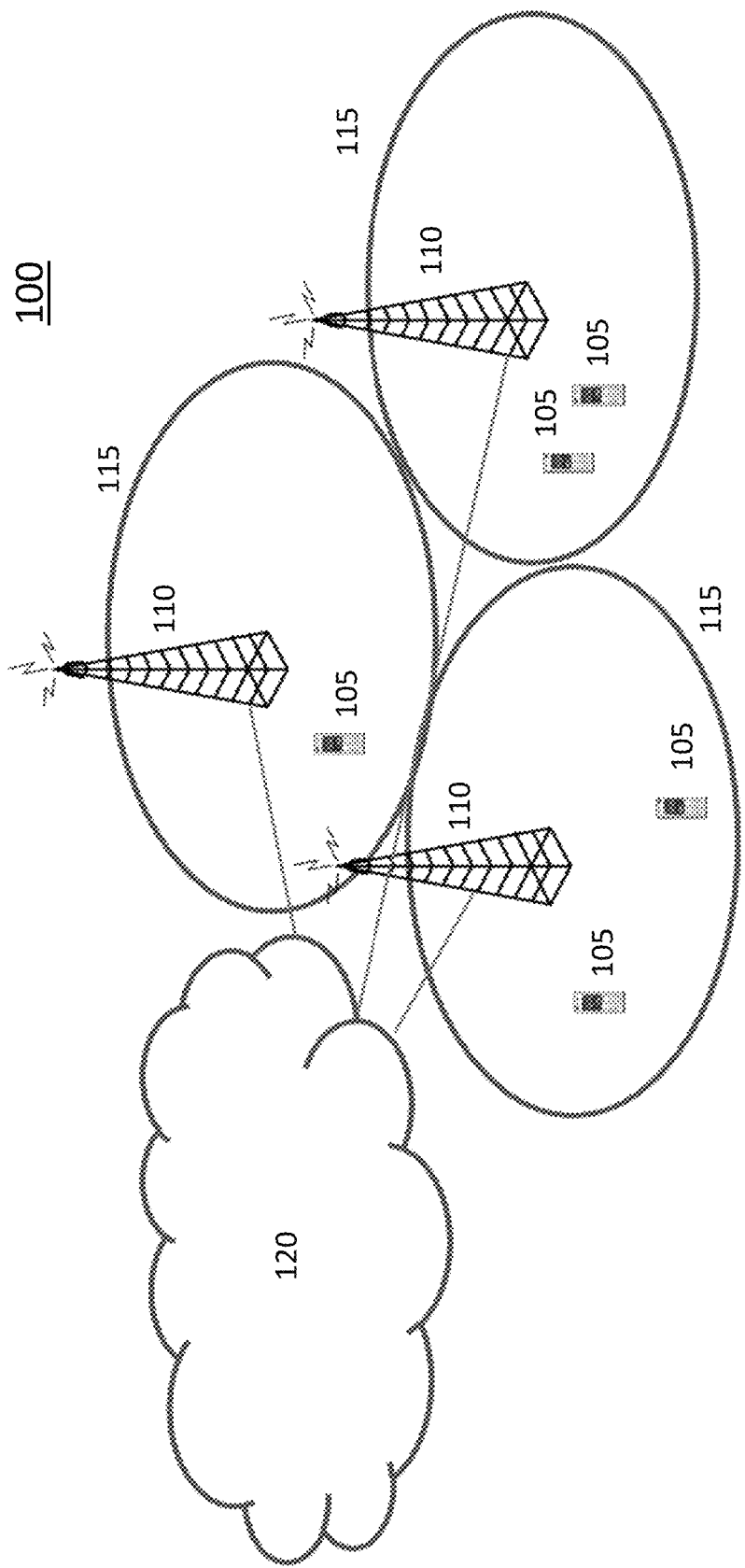
FIG. 1 is a diagram illustrating an LTE network.

Please note that although terminology from 3GPP NR has been used in this disclosure to exemplify the invention, this should not be limiting the scope of the invention to only the abovementioned systems. Other wireless systems may also benefit from exploiting the ideas covered within this disclosure.

Please note that terminologies such as base station/gNodeB and UE should be considered non-limiting and does in particular not imply a certain hierarchical relation between the two; in general, "gNodeB" could be considered as device 1 and "UE" could be considered as device 2 and these two devices communicate with each other over some radio channel. And in the following the transmitter or receiver could be either gNB, or UE.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Radio Node: As used herein, a "radio node" is either a radio access node or a wireless device.

Controlling Node: As used herein, a "controlling node" either a radio access node or a wireless device used to manage, control or configure another node.

Radio Access Node: As used herein, a "radio access node" is any node in a radio access network of a cellular communications network that operates to wirelessly transmit and/or receive signals. Some examples of a radio access node include, but are not limited to, a base station (e.g., an enhanced or evolved Node B (eNB) in a Third Generation Partnership Project (3GPP) Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a Core Network (CN). Some examples of a core network node include, e.g., a Mobility Management Entity (MME), an Evolved-Serving Mobile Location Center (E-SMLC), a Packet Data Network (PDN) Gateway (P-GW), a Service Capability Exposure Function (SCEF), or the like.

Wireless Device: As used herein, a "wireless device" is any type of device that is capable of wirelessly transmitting and/or receiving signals to/from another wireless device or to/from a network node in a cellular communications network to obtain has access to (i.e., be served by) the cellular communications network. Some examples of a wireless device include, but are not limited to, a User Equipment (UE) in a 3GPP network, a Machine Type Communication (MTC) device, an NB-IoT device, a FeMTC device, etc.

Network Node: As used herein, a "network node" is any node that is either part of the radio access network or the CN of a cellular communications network/system or a test equipment node.

Signaling: As used herein, "signaling" comprises any of: high-layer signaling (e.g., via Radio Resource Control (RRC) or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

Unless stated otherwise, the following embodiments apply to all modes of operation described above.

Example Embodiment 1

Puncturing/Rate Matching in all Guardbands

For the PRBs (or parts of PRBs) in all guard bands of all LBT bandwidth pieces that pass LBT, puncturing/rate matching is performed. That is, no coded bits are mapped to the radio resources located in the guard bands.

Example Embodiment 2

Puncturing/Rate Matching Accounting for Contiguous Free LBT Bandwidth Pieces

Same as Embodiment #1, except that for the case when two or more LBT bandwidth pieces that pass LBT are contiguous, puncturing rate/matching for the contiguous LBT bandwidth pieces is performed only for the guard bands at the edges of the contiguous block.

This can be enabled in the DL and UL as follows. The UE/gNB can determine which part of guard bands are punctured by monitoring PDCCH/DMRS and recognizing which LBT bandwidth piece(s) were available and used by the gNB/UE. Once UE/gNB knows which LBT BWPs were used, it can know exactly which guard bands were punctured (i.e., the guard bands between non-contiguous used LBT BWPs).

Example Embodiment 3

Scheduling in Multiple Slots of a COT

Puncturing/rate matching is performed as in Embodiment #1 for the first N slots of a channel occupancy time (COT), and for the remaining slots puncturing/rate matching is performed as in Embodiment #2.

In a sub-embodiment, N is fixed by specification.

In an alternative sub-embodiment, for the DL, N is indicated to the receiving device through either physical layer control signaling (e.g., DCI) or by higher layer signaling, e.g., a message in MAC-CE or RRC.

Alternatively, for the DL, puncturing/rate matching is performed as in Embodiment #1 or #2 for the first N slots of a transmission burst, and for the remaining slots puncturing/rate matching is disabled. For the remaining transmission in the burst, the gNB does not schedule any PRBs that fall within the bandwidth pieces that fail LBT, nor on the guard bands that are on the edge of the contiguous blocks that succeed LBT. Given that the guard bands are not scheduled, no special handling for the guard bands is needed at the UE side.

Example Embodiment 4

Indication of Puncturing Rate/Matching

For the DL, the transmitting device indicates for a given slot what puncturing/rate matching assumptions the receiving device shall make for one or more LBT bandwidth piece(s). For example, the indication may be through a bit field in the same DCI that schedules the PDSCH. For each indicated bandwidth piece, the indication may be that puncturing/rate matching is performed in 0, 1, or 2 of the guardbands associated with that LBT bandwidth piece.

For this embodiment, we also define two further sub-modes of operation Mode 2:

Mode 2a: A UE is scheduled with a single PDSCH that spans all the bandwidth pieces for which LBT was successful.

Mode 2b: A UE is scheduled with a separate PDSCH in each bandwidth piece from a PDCCH that is sent in the CORESET in the same bandwidth piece. As part of this embodiment, it is assumed that the UE may either operate with multiple bandwidth parts or be able to receive multiple PDCCHs and PDSCHs within a single bandwidth part.

In an exemplary embodiment, the guard bands for each of the LBT bandwidth pieces is configured via RRC as a rate matching pattern. Whether the PDSCH is rate matched around these guard bands is then indicated in the DCI message scheduling the PDSCH. As part of this embodiment, the span of the PRBs that can be signaled to be part of a rate matching pattern is extended to include any PRB s that span the guard band.

When operating in Mode 1, the UE is configured with two rate matching groups, one with a resource set that maps to the guard band on one side of the carrier and the other with a resource set that maps to the guard band on the other side of the carrier. The DCI message then is configured to include two bits, one for each rate matching group. The resources unavailable for PDSCH are then determined as the union of the resource sets corresponding to the rate matching groups for which the DCI bit is set.

When operating in Mode 2b, the UE configuration can be similar to that of Mode 1 where the guard bands correspond to an LBT bandwidth piece instead of a component carrier. If the UE is operating with multiple bandwidth parts, then existing NR capability can be used with the configuration taught as part of this embodiment. If the UE is operating with multiple PDCCHs/PDSCHs within a bandwidth part, as part of this embodiment, the rate matching resource definition is defined per DCI message received in addition to being defined per bandwidth part and per cell in the current specifications.

Figure 3:
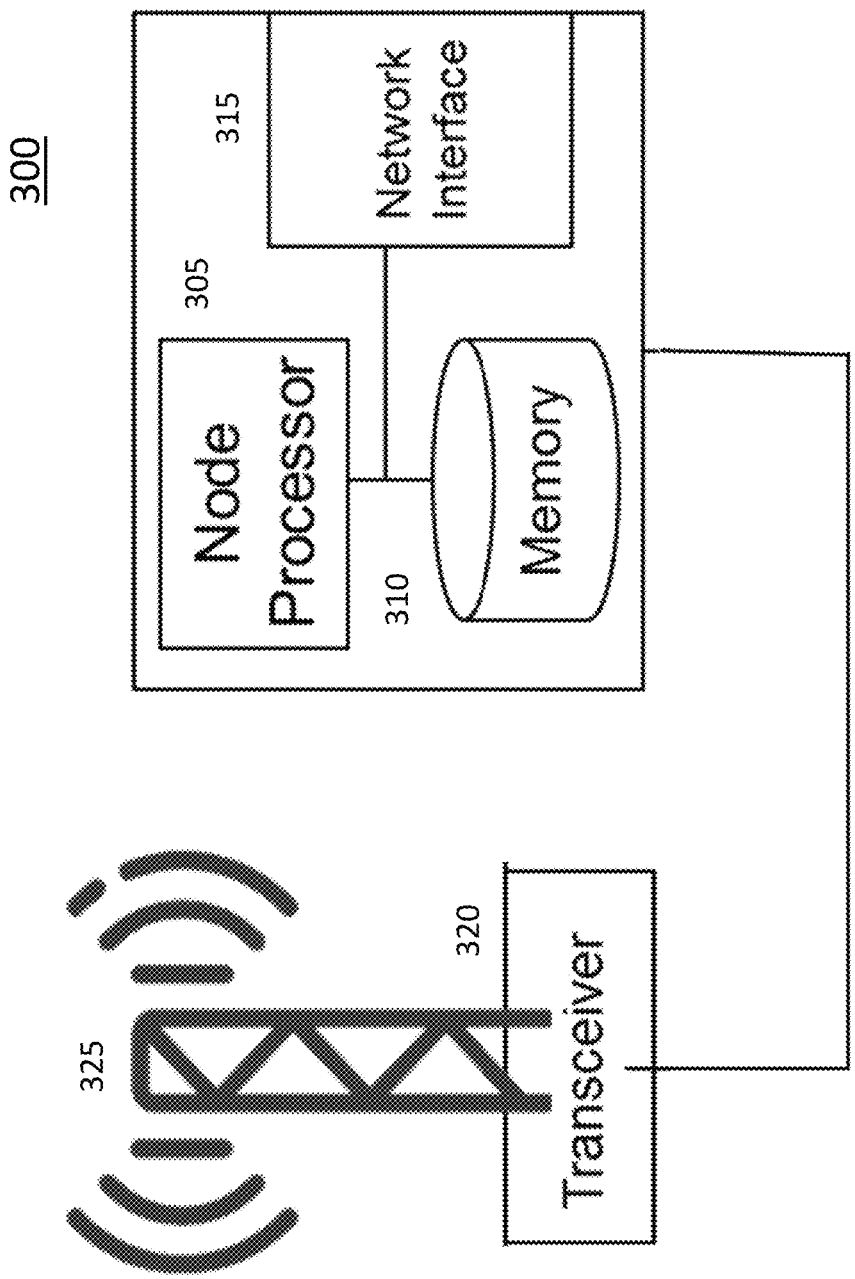
FIG. 3 is a diagram illustrating a radio access node.
Figure 4:
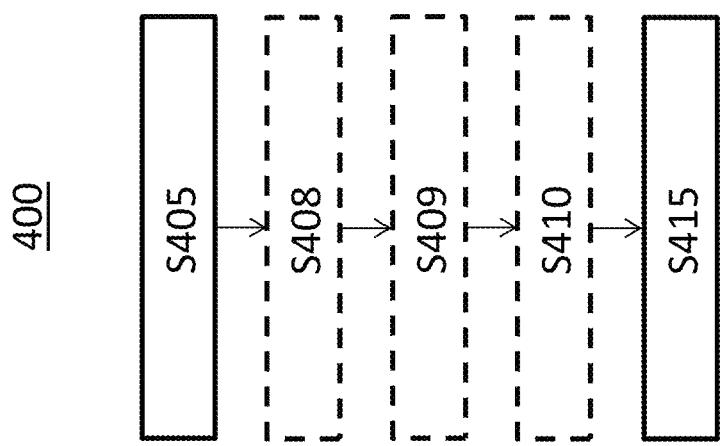
FIG. 4 is a flowchart illustrating a method of operating a first node.
Figure 5:
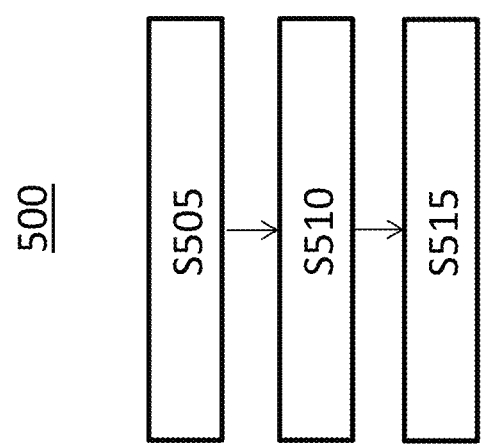
FIG. 5 is a flowchart illustrating another method of operating a first node.
Figure 6:
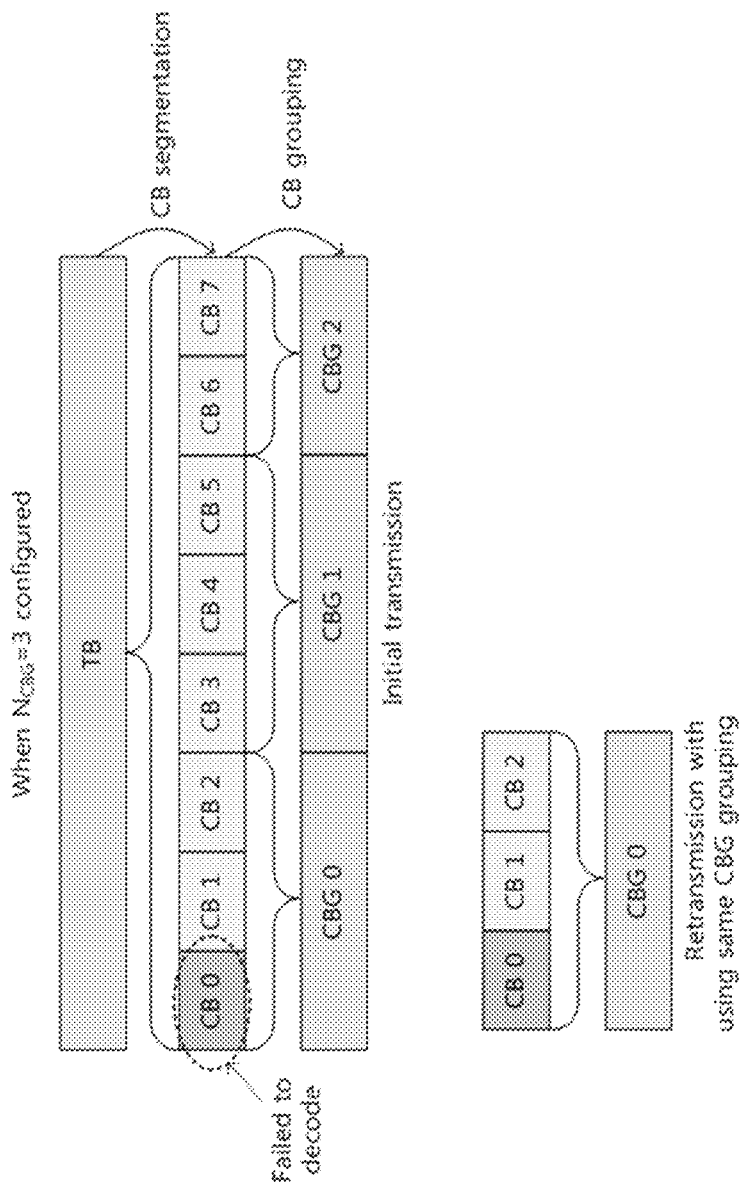
FIG. 6 is a diagram illustrating NR code block group operations.
Figure 7:
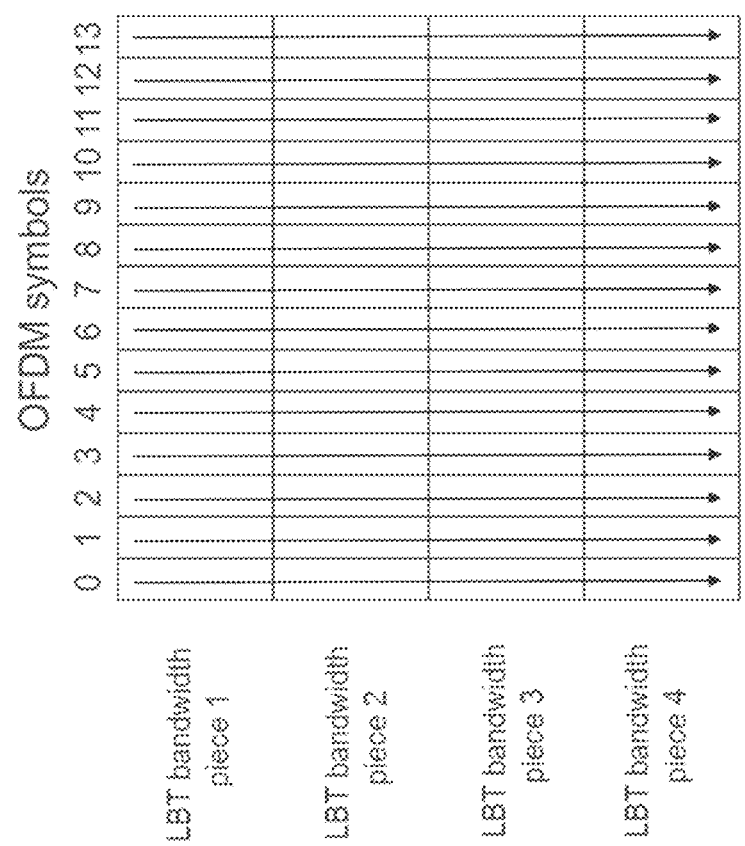
FIG. 7 is a diagram illustrating a data mapping rule used for NR-U.
Figure 8:
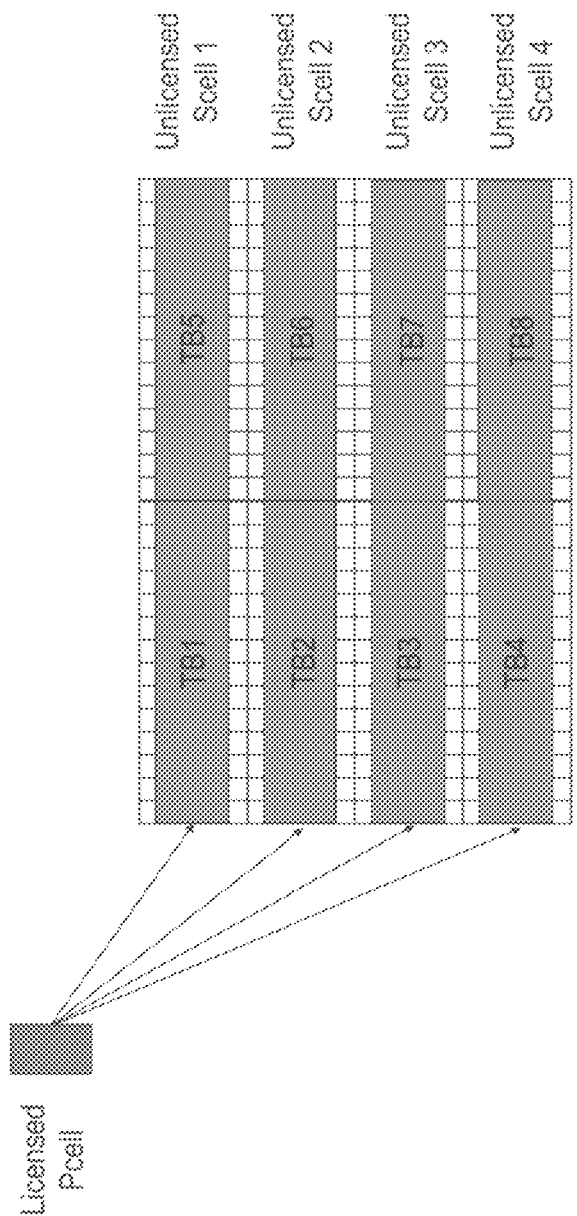
FIG. 8 is a diagram illustrating multi-channel UL transmission for LTE-eLAA.
Figure 9:
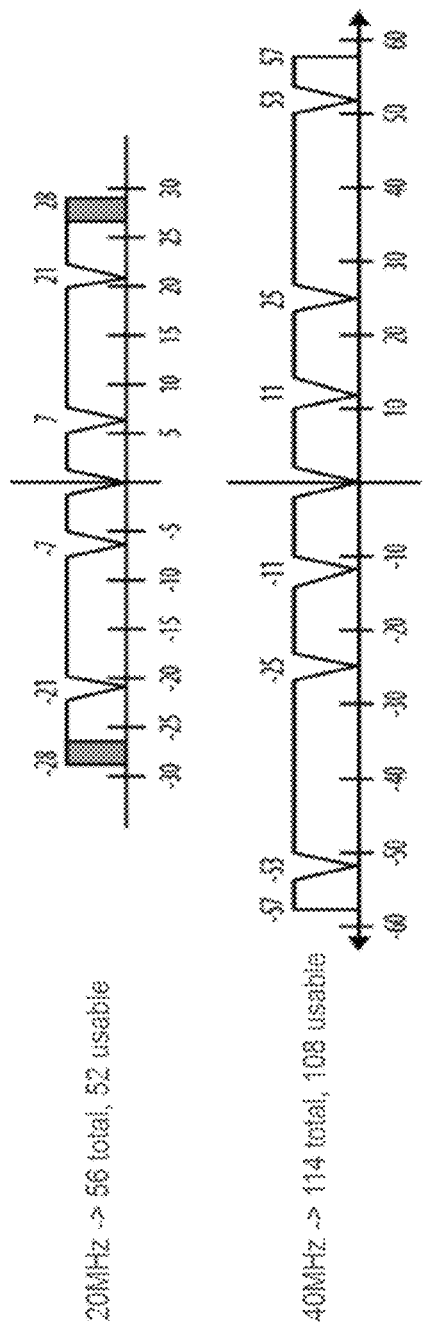
FIG. 9 is a diagram illustrating multi-channel UL transmission for Wi-Fi.

When operating in Mode 2a with four LBT bandwidth pieces as shown in FIG. 3 and FIG. 4, there are 8 guard bands that can be rate matched around. Now, considering FIG. 5, the guard bands are numbered from top to bottom in sequence from 1 to 8. As shown in FIG. 5, the guard bands that are between adjacent carriers are also adjacent, e.g., guard bands 2 and 3 are adjacent, guard bands 4 and 5 are adjacent and so on. Then, all the relevant rate matching scenarios can be addressed by expanding the number of rate matching groups that can dynamically be indicated via the DCI message to three and defining each rate matching group as follows:

Rate matching group 1 includes guard bands 2 and 3
Rate matching group 2 includes guard bands 4 and 5
Rate matching group 3 includes guard bands 6 and 7

Then, with one bit in the DCI for each rate matching group, all necessary rate matching patterns can be indicated by setting the relevant bits for the rate matching groups to 1 so that the union of the rate matching patterns in each group form the set of resources that are unavailable for PDSCH reception.

If it is desired that the DCI size should not be increased beyond the current size of two bits, in one example of this embodiment, the following resource sets are configured to the UE for each of the rate matching groups. Guard bands 2, 3, 4 and 5 are included in one rate matching group and guard bands 2, 3, 6 and 7 are included in another rate matching group. This can also be combined with implicit rules as in the previous embodiments to determine whether the guard band for which no rate matching information is provided should be rate matched around or not.

An advantage of using dynamic signaling is that the gNB can decide when guard bands should be used during a channel occupancy dynamically. Also, the use of the existing mechanism for defining rate matching patterns allows flexibility in controlling the width of the guard bands as well.

Example Embodiment 5

Adaptation in the Time Duration

The embodiments below are described with reference to a channel bandwidth of 80 MHz and performing LBT over individual 20 MHz pieces. The teaching can be practiced for other channel bandwidth and LBT bandwidth sizes, however.

When operating in Mode 2a, before obtaining the channel across 80 MHz, the transmitter prepares a transport block suitable for transmitting over one 20 MHz. The transmitter further prepares several different PDCCHs:

One PDCCH type is aimed for the case when all 80 MHz is available and the DCI contains a time domain allocation of only 4 OFDM symbols long.
One PDCCH type is aimed for the case when only 40 MHz is available and the DCI contains a time domain allocation of only 7 OFDM symbols long.
One PDCCH type is aimed for the case when only 20 MHz is available and the DCI contains a time domain allocation of 14 OFDM symbols long.

Based on the outcome of the LBT, at least one PDCCH from the above generated PDCCHs is transmitted at the beginning of the slot. Following the PDCCH, the transmitter sends the coded signal for the transport block over one of the 20, 40 or 80 MHz with a corresponding duration of 14, 7 or 4 OFDM symbols.

In addition to the above PDCCHs, the transmitter may also prepare other combinations to be able to transmit on the channel when LBT failures occur in a manner where transmission of discontiguous blocks is necessitated e.g.:

- a PDCCH aimed for the case that there are two discontiguous 20 MHz bandwidth pieces for which LBT is successful with a time domain allocation of 7 symbols,
- a PDCCH aimed for the case that there are two discontiguous bandwidth pieces for which LBT is successful, one that is 20 MHz wide and one that is 40 MHz wide. The time domain allocation for this case may be 10 symbols.

The described embodiments may be implemented in any appropriate type of communication system supporting any suitable communication standards and using any suitable components. As one example, certain embodiments may be implemented in an NR network, such as that illustrated in FIG. 1.

Referring to FIG. 1, a communication network 100 comprises a plurality of wireless communication devices 105 (e.g., conventional UEs, machine type communication [MTC]/machine-to-machine [M2M] UEs) and a plurality of radio access nodes 110 (e.g., gNodeBs or other base stations). Communication network 100 is organized into cells 115, which are connected to a core network 120 via corresponding radio access nodes 110. Radio access nodes 110 are capable of communicating with wireless communication devices 105 along with any additional elements suitable to support communication between wireless communication devices or between a wireless communication device and another communication device (such as a landline telephone).

Figure 2:
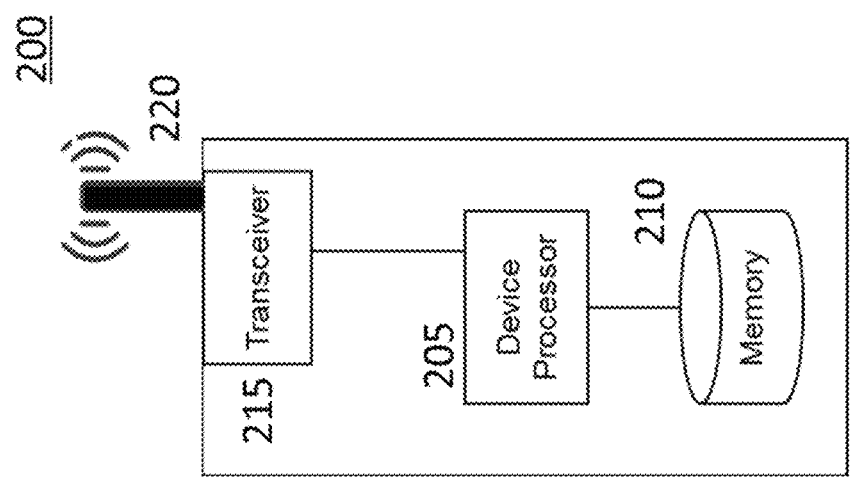
FIG. 2 is a diagram illustrating a wireless communication device.

Although wireless communication devices 105 may represent communication devices that include any suitable combination of hardware and/or software, these wireless communication devices may, in certain embodiments, represent devices such as an example wireless communication device illustrated in greater detail by FIG. 2. Similarly, although the illustrated radio access node may represent network nodes that include any suitable combination of hardware and/or software, these nodes may, in particular embodiments, represent devices such as the example radio access node illustrated in greater detail by FIG. 3.

Referring to FIG. 2, a wireless communication device 200 comprises a processor 205, a memory, a transceiver 215, and an antenna 220. In certain embodiments, some or all of the functionality described as being provided by UEs, MTC or M2M devices, and/or any other types of wireless communication devices may be provided by the device processor executing instructions stored on a computer-readable medium, such as the memory shown in FIG. 2. Alternative embodiments may include additional components beyond those shown in FIG. 2 that may be responsible for providing certain aspects of the device's functionality, including any of the functionality described herein and in particular in FIGS. 4, 5, 13, and 14. It will be appreciated that the device processor 205 may comprise one or more microprocessors, microcontrollers, digital signal processors, and the like, with these one or more processing elements being configured to execute program code stored in memory 210, to control the transceiver 215 and to execute all or some of the functionality described herein, and may include, in some embodiments, hard-coded digital logic that carries out all or some of the functionality described herein, e.g., including the process steps shown in FIGS. 4, 5, 13, and 14. The term "processing circuit" is used herein to refer to any one of these combinations of processing elements.

Referring to FIG. 3, a radio access node 300 comprises a node processor 305, a memory 310, a network interface 315, a transceiver 320, and an antenna 325. Again, it will be appreciated that the node processor 305 may comprise one or more microprocessors, microcontrollers, digital signal processors, and the like, with these one or more processing elements being configured to execute program code stored in memory 310, to control the transceiver 320 and the network 315 and to execute all or some of the functionality described herein, and may include, in some embodiments, hard-coded digital logic that carries out all or some of the functionality described herein. This functionality includes, for example, the operations shown in the flowcharts of FIGS. 4, 5, 13, and 14. The term "processing circuit" is used herein to refer to any one of these combinations of processing elements.

Thus, in certain embodiments, some or all of the functionality described as being provided by a base station, a node B, an enodeB, and/or any other type of network node may be provided by node processor 305 executing instructions stored on a computer-readable medium, such as memory 310 shown in FIG. 3. Again, this functionality includes, for example, the operations shown in the flowcharts of FIGS. 4, 5, 13, and 14. Alternative embodiments of radio access node 300 may comprise additional components to provide additional functionality, such as the functionality described herein and/or related supporting functionality.

FIG. 4 is a flowchart illustrating an example method 400 of operating a first node (e.g., a wireless device 105) to receive a data transmission from a second node (e.g., a radio access node 110). The method 400 comprises a step S405 in which a control message allocating a plurality of radio resources (e.g., physical resource blocks or portions thereof) in a bandwidth part for use in at least one data channel is received from the second node. The data channel may be a physical downlink shared channel (PDSCH) or a physical uplink shared channel (PUSCH). The bandwidth part is divided into a plurality of bandwidth pieces. An LBT procedure may be performed on each of the plurality of bandwidth pieces to determine whether the bandwidth piece is available for transmission of a data transmission to/from the first node. The method further comprises a step S415 in which the data transmission is received from or transmitted to the second node using radio resources corresponding to at least one of the plurality of bandwidth pieces. Notably, the radio resources used to receive or transmit the data transmission exclude one or more radio resources that map to at least a portion of at least one guard band located between two of the bandwidth pieces. Exclusion of the one or more radio resources may be accomplished by, for example, puncturing or rate matching the data transmission, as described in further detail above.

The method 400 may further comprise additional optional steps, including a step S408 and a step S409. In step S408 the first node determines that a frequency-contiguous block of one or more bandwidth pieces is to be used for reception or transmission of the data transmission. In step S409 the first node determines that among the radio resources mapping to the frequency-contiguous block only one or more radio resources mapping to guard bands at the edges of the frequency-contiguous block are excluded from being used to receive or transmit the data transmission. In some embodiments the control message referenced in step S405 (or, alternatively, another control message) includes an indication that the frequency-contiguous block of one or more bandwidth pieces is to be used for reception or transmission of the data transmission and the determining, at step S408, is based at least partially on the indication.

Moreover, in some embodiments, the determining, at step S409, that only one or more radio resources mapping to guard bands at the edges of the frequency-contiguous block are excluded from being used to receive or transmit the data transmission, is based at least partially on a pre-determined or pre-programmed rule, such as a rule in a relevant communications standard. Alternatively, the determining at step S409 is based at least partially on an implicit indication from the second node, when the first node is receiving data transmissions from the second node (when the data transmission is transmitted from the first node to the second node, the first node sends the implicit indication to the second node). The implicit indication may include successful detection of a demodulation reference signal (DMRS) in two or more frequency-contiguous bandwidth pieces. Instead, or in addition, the implicit indication may include successful detection of a DMRS in one or more radio resources mapping to the guard bands in between one or more frequency-contiguous bandwidth pieces. Successful detection of a DMRS implicitly indicates to the data transmission receiving node that the corresponding guard bands were allocated. In FIG. 4, steps S408 and S409 are shown preceding the receipt or transmission of the data transmission in step S415 but instead the steps may be performed after or as part of receipt or transmission of the data transmission in step S415.

The method may still further comprise, in some embodiments, an optional step S410 that precedes the receipt/transmission of the data transmission in step S415. In step S410 a control message is received that indicates to the first node the at least one guard band or portion thereof corresponding to the one or more radio resources that are excluded from use for the data transmission. The control message may include one or more bits, each of the one or more bits corresponding to at least one of a plurality of guard bands located between the bandwidth pieces and indicating to the first node whether at least one or more radio resources that map to the corresponding at least one guard band are excluded from use for the data transmission. A bit in the control message may correspond to multiple ones of the plurality of guard bands (e.g., guard bands that are frequency contiguous). In some embodiments the control message indicating the at least one guard band or portion thereof is included as part of the control message referenced in step S405 that allocates a plurality of radio resources in a bandwidth part.

FIG. 5 illustrates another flowchart, this flowchart showing another example method 500 of operating the first node (e.g., a wireless device 105). As seen at step S505, the illustrated method comprises receiving, from the second node (e.g., a radio access node 110), a control message allocating a plurality of radio resources in a bandwidth part for use in at least one data channel (e.g., PDSCH or PUSCH). The bandwidth part is divided into a plurality of bandwidth pieces and the control message is a one of a plurality of predetermined control message types (e.g., PDCCH types) that is indicative of an outcome of an LBT procedure performed on each of the bandwidth pieces.

As seen at step S510, the method further comprises determining a time domain allocation for the data transmission based at least partially on the control message type. As seen at step S515, the method further comprises receiving or transmitting, from or to the second node, the data transmission based at least partially on the determined time domain allocation.

In some embodiments, a different time domain allocation is associated with each of the plurality of predetermined control message types and the different time domain allocations vary inversely with the bandwidth occupied by the data transmission. Moreover, in some embodiments, the bandwidth occupied by the data transmission depends on the outcome of the LBT procedure performed on each of the bandwidth pieces. Furthermore, in some embodiments of the method 500, a time domain allocation of a first number of OFDM symbols is used when the data transmission occupies a first bandwidth and a time domain allocation of a second number of OFDM symbols is used when the data transmission occupies a second bandwidth, where the second number of OFDM symbols is larger than the first number of OFDM symbols and the second bandwidth is smaller than the first bandwidth.

Figure 13:
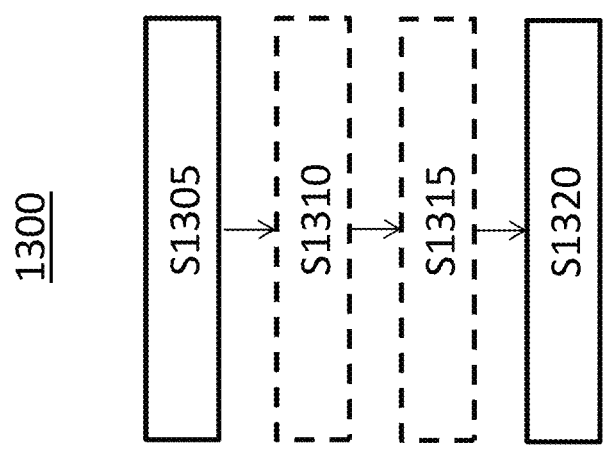
FIG. 13 is a flowchart illustrating a method of operating a second node.

FIG. 13 is a flowchart illustrating an example method 1300 of operating the second node (e.g., a radio access node 110) that transmits (or receives) a data transmission to (or from) the first node (e.g., a wireless device 105). The method 1300 comprises a step S1305 in which a control message allocating a plurality of radio resources (e.g., physical resource blocks or portions thereof) in a bandwidth part for use in at least one data channel is transmitted to the first node. The data channel may be a physical downlink shared channel (PDSCH) or a physical uplink shared channel (PUSCH). The bandwidth part is divided into a plurality of bandwidth pieces. An LBT procedure may be performed on each of the plurality of bandwidth pieces to determine whether the bandwidth piece is available for transmission of the data transmission to/from the first node. The method further comprises a step S1320 in which the data transmission is transmitted or received to the first node using radio resources corresponding to at least one of the plurality of bandwidth pieces. Notably, the radio resources used to transmit or receive the data transmission exclude one or more radio resources that map to at least a portion of at least one guard band located between two of the bandwidth pieces. Exclusion of the one or more radio resources may be accomplished by, for example, puncturing or rate matching the data transmission.

The method 1300 may further comprise additional optional steps, including a step S1310 and a step S1315. In step S1310 the second node determines that a frequency-contiguous block of one or more bandwidth pieces is to be used for transmission of the data transmission. (There may also be other bandwidth pieces determined to be used but that are not frequency-contiguous with any other bandwidth pieces.) From among the radio resources mapping to the frequency-contiguous block, one or more radio resources that are excluded by the second network node from use in the transmission of the data transmission include only one or more radio resources mapping to guard bands at the edges of the frequency-contiguous block.

In step S1315, the second node transmits a control message to the first node, the control message indicating to the first node the at least one guard band corresponding to the one or more radio resources that are excluded from use in the data transmission.

Figure 14:
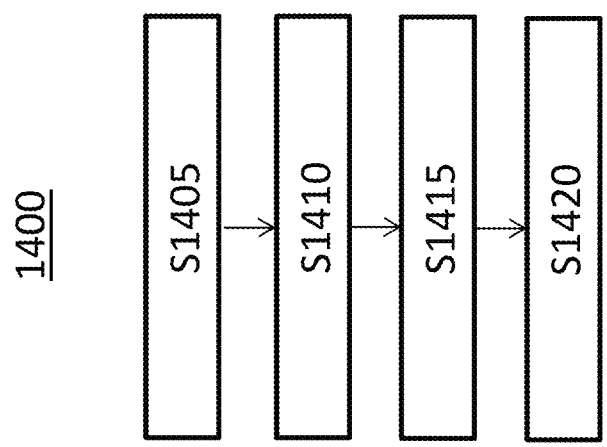
FIG. 14 is a flowchart illustrating another method of operating a second node.

FIG. 14 illustrates another flowchart, this flowchart showing another example method 1400 of operating the second node (e.g., the radio access node 110). As seen at step S1405, the illustrated method comprises performing an LBT procedure on each of a plurality of bandwidth pieces that are comprised in a bandwidth part. As seen at step S1410, the method further comprises selecting one of a plurality of control message types based at least partially on an outcome of the LBT procedures. As seen at step S1415, the method further comprises transmitting, to the first node (e.g., a wireless device 105), a control message of the control message type. The control message allocates a plurality of radio resources in the bandwidth part for use in at least one data channel and the control message type indicates to the first node a time domain allocation for the data transmission. Finally, as seen at step S1420, the method comprises transmitting, to the first node, the data transmission using the indicated plurality of bandwidth pieces.

Figure 15:
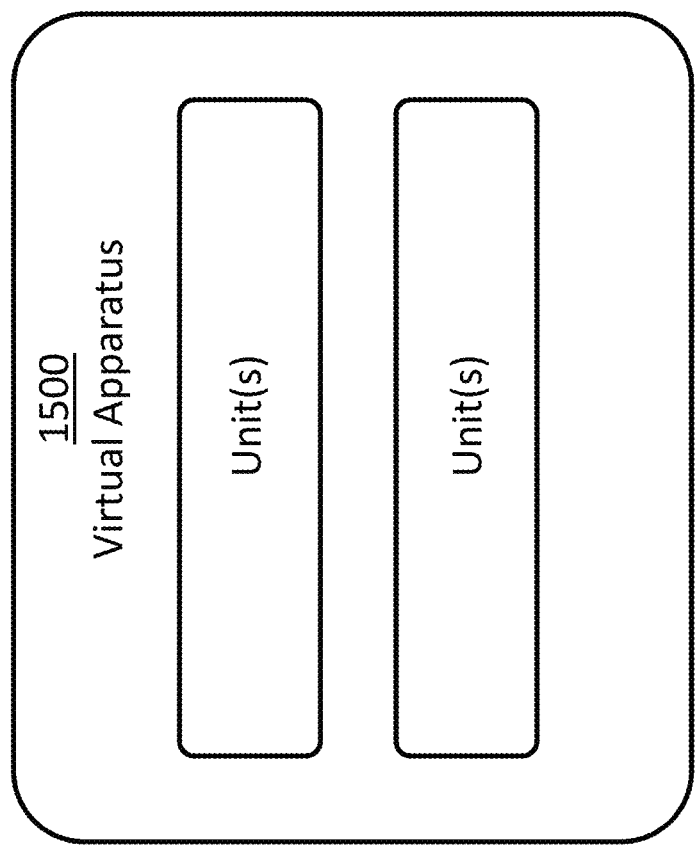
FIG. 15 is a graphical illustration of a virtual network node or wireless device apparatus.

FIG. 15 illustrates a schematic block diagram of an apparatus 1500 in a wireless network (for example, the wireless network shown in FIG. 1). The apparatus may be implemented in a wireless device (e.g., wireless device 105 or 200 shown in FIGS. 1 and 2 respectively) or in a network node (e.g., radio access node 110 or 300 shown in FIGS. 1 and 3 respectively). Example embodiments of apparatus 1500 are operable to carry out any one of the example methods described with reference to FIGS. 4, 5, 13, and 14, and possibly any other processes or methods disclosed herein. It is also to be understood that the methods of FIGS. 4, 5, 13, and 14 are not necessarily carried out solely by apparatus 1500. At least some operations of the method can be performed by one or more other entities.

Virtual Apparatus 1500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to perform the functionality of receiving and transmitting units and any other suitable units needed to perform corresponding functions according to one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Operation in Virtualization Environments

Figure 16:
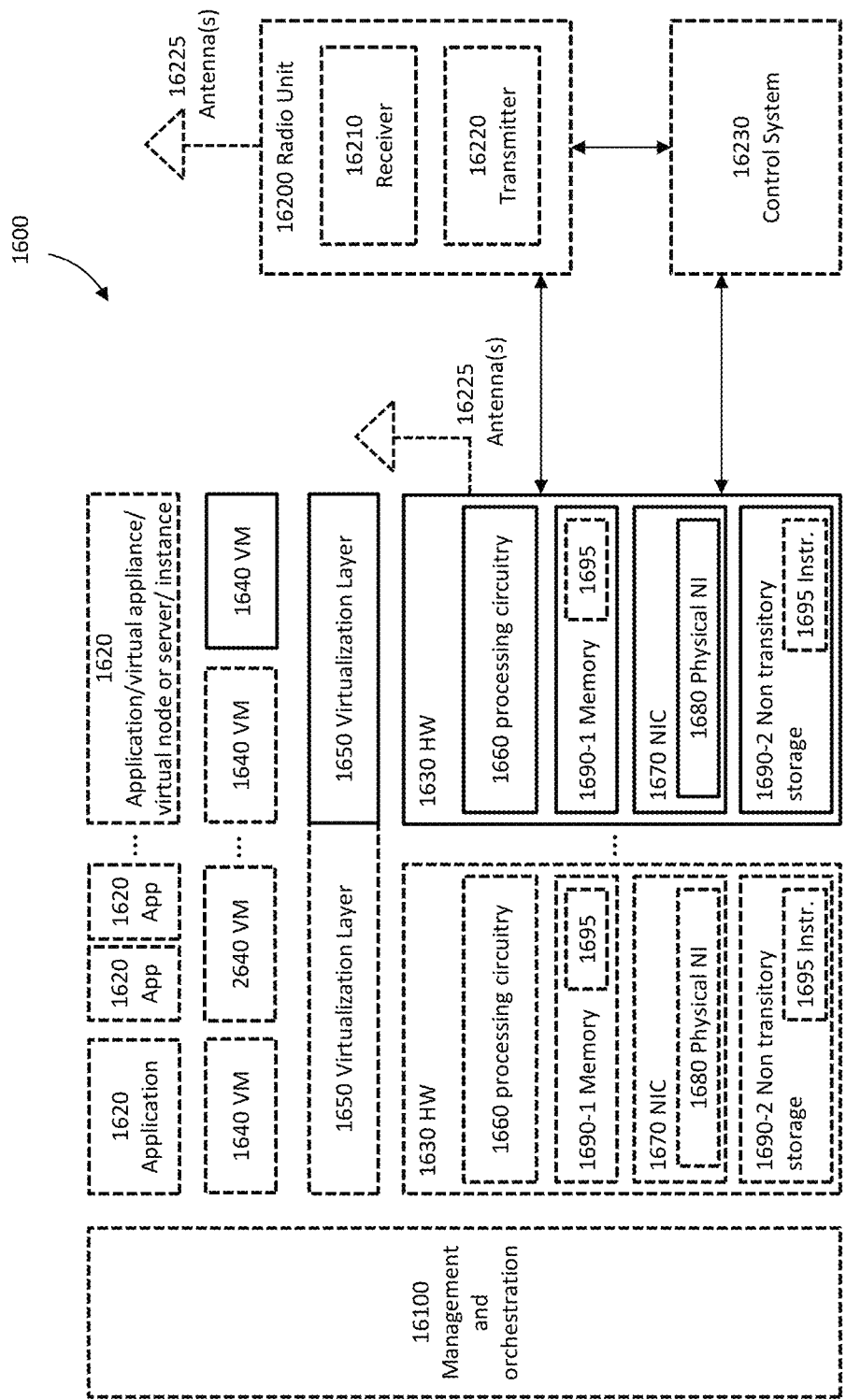
FIG. 16 is a graphical illustration of an example virtualization environment in which embodiments of the invention may operate.

FIG. 16 is a schematic block diagram illustrating a virtualization environment 1600 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1600 hosted by one or more of hardware nodes 1630. Further, in embodiments in which the virtual node is not a radio access node or does not require radio connectivity (e.g., a core network node), then the network node may be entirely virtualized.

The functions may be implemented by one or more applications 1620 (which may alternatively be called software instances, virtual appliances, network functions, virtual nodes, virtual network functions, etc.) operative to implement some of the features, functions, and/or benefits of some of the embodiments disclosed herein. Applications 1620 are run in virtualization environment 1600 which provides hardware 1630 comprising processing circuitry 1660 and memory 1690. Memory 1690 contains instructions 1695 executable by processing circuitry 1660 whereby application 1620 is operative to provide one or more of the features, benefits, and/or functions disclosed herein.

Virtualization environment 1600, comprises general-purpose or special-purpose network hardware devices 1630 comprising a set of one or more processors or processing circuitry 1660, which may be commercial off-the-shelf (COTS) processors, dedicated Application Specific Integrated Circuits (ASICs), or any other type of processing circuitry including digital or analog hardware components or special purpose processors. Each hardware device may comprise memory 1690-1 which may be non-persistent memory for temporarily storing instructions 1695 or software executed by processing circuitry 1660. Each hardware device may comprise one or more network interface controllers (NICs) 1670, also known as network interface cards, which include physical network interface 1680. Each hardware device may also include non-transitory, persistent, machine-readable storage media 1690-2 having stored therein software 1695 and/or instructions executable by processing circuitry 1660. Software 1695 may include any type of software including software for instantiating one or more virtualization layers 1650 (also referred to as hypervisors), software to execute virtual machines 1640 as well as software allowing it to execute functions, features and/or benefits described in relation with some embodiments described herein.

Virtual machines 1640, comprise virtual processing, virtual memory, virtual networking or interface and virtual storage, and may be run by a corresponding virtualization layer 1650 or hypervisor. Different embodiments of the instance of virtual appliance 1620 may be implemented on one or more of virtual machines 1640, and the implementations may be made in different ways.

During operation, processing circuitry 1660 executes software 1695 to instantiate the hypervisor or virtualization layer 1650, which may sometimes be referred to as a virtual machine monitor (VMM). Virtualization layer 1650 may present a virtual operating platform that appears like networking hardware to virtual machine 1640.

As shown in FIG. 16, hardware 1630 may be a standalone network node with generic or specific components. Hardware 1630 may comprise antenna 16225 and may implement some functions via virtualization. Alternatively, hardware 1630 may be part of a larger cluster of hardware (e.g. such as in a data center or customer premise equipment (CPE)) where many hardware nodes work together and are managed via management and orchestration (MANO) 16100, which, among others, oversees lifecycle management of applications 1620.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 1640 may be a software implementation of a physical machine that runs programs as if they were executing on a physical, non-virtualized machine. Each of virtual machines 1640, and that part of hardware 1630 that executes that virtual machine, be it hardware dedicated to that virtual machine and/or hardware shared by that virtual machine with others of the virtual machines 1640, forms a separate virtual network elements (VNE).

Still in the context of NFV, Virtual Network Function (VNF) is responsible for handling specific network functions that run in one or more virtual machines 1640 on top of hardware networking infrastructure 1630 and corresponds to application 1620 in FIG. 16.

In some embodiments, one or more radio units 16200 that each include one or more transmitters 16220 and one or more receivers 16210 may be coupled to one or more antennas 16225. Radio units 16200 may communicate directly with hardware nodes 1630 via one or more appropriate network interfaces and may be used in combination with the virtual components to provide a virtual node with radio capabilities, such as a radio access node or a base station.

In some embodiments, some signaling can be effected with the use of control system 16230 which may alternatively be used for communication between the hardware nodes 1630 and radio units 16200.

Operation with Remote Host Computers

Figure 17:
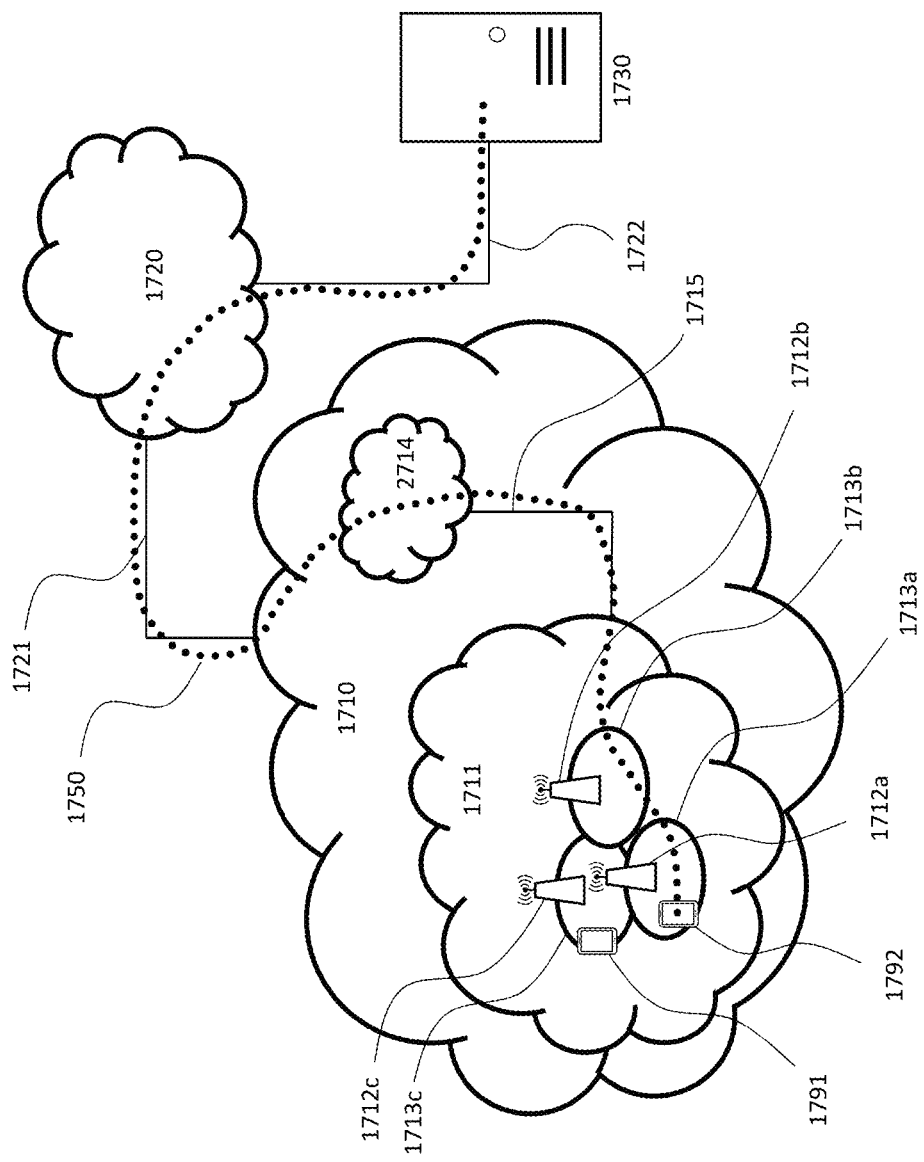
FIG. 17 is a graphical illustration of a telecommunication network connected via an intermediate network to a host computer in accordance with some embodiments.

With reference to FIG. 17, in accordance with an embodiment, a communication system includes telecommunication network 1710, such as a 3GPP-type cellular network, which comprises access network 1711, such as a radio access network, and core network 1714. Access network 1711 comprises a plurality of base stations 1712a, 1712b, 1712c, such as NBs, eNBs, gNBs or other types of wireless access points, each defining a corresponding coverage area 1713a, 1713b, 1713c. Each base station 1712a, 1712b, 1712c is connectable to core network 1714 over a wired or wireless connection 1715. A first UE 1791 located in coverage area 1713c is configured to wirelessly connect to, or be paged by, the corresponding base station 1712c. A second UE 1792 in coverage area 1713a is wirelessly connectable to the corresponding base station 1712a. While a plurality of UEs 1791, 1792 are illustrated in this example, the disclosed embodiments are equally applicable to a situation where a sole UE is in the coverage area or where a sole UE is connecting to the corresponding base station 1712.

Telecommunication network 1710 is itself connected to host computer 1730, which may be embodied in the hardware and/or software of a standalone server, a cloud-implemented server, a distributed server or as processing resources in a server farm. Host computer 1730 may be under the ownership or control of a service provider, or may be operated by the service provider or on behalf of the service provider. Connections 1721 and 1722 between telecommunication network 1710 and host computer 1730 may extend directly from core network 1714 to host computer 1730 or may go via an optional intermediate network 1720. Intermediate network 1720 may be one of, or a combination of more than one of, a public, private or hosted network; intermediate network 1720, if any, may be a backbone network or the Internet; in particular, intermediate network 1720 may comprise two or more sub-networks (not shown).

The communication system of FIG. 17 as a whole enables connectivity between the connected UEs 1791, 1792 and host computer 1730. The connectivity may be described as an over-the-top (OTT) connection 1750. Host computer 1730 and the connected UEs 1791, 1792 are configured to communicate data and/or signaling via OTT connection 1750, using access network 1711, core network 1714, any intermediate network 1720 and possible further infrastructure (not shown) as intermediaries. OTT connection 1750 may be transparent in the sense that the participating communication devices through which OTT connection 1750 passes are unaware of routing of uplink and downlink communications. For example, base station 1712 may not or need not be informed about the past routing of an incoming downlink communication with data originating from host computer 1730 to be forwarded (e.g., handed over) to a connected UE 1791. Similarly, base station 1712 need not be aware of the future routing of an outgoing uplink communication originating from the UE 1791 towards the host computer 1730.

Example implementations, in accordance with an embodiment, of the UE, base station and host computer discussed in the preceding paragraphs will now be described with reference to FIG. 18. In communication system 1800, host computer 1810 comprises hardware 1815 including communication interface 1816 configured to set up and maintain a wired or wireless connection with an interface of a different communication device of communication system 1800. Host computer 1810 further comprises processing circuitry 1818, which may have storage and/or processing capabilities. In particular, processing circuitry 1818 may comprise one or more programmable processors, application-specific integrated circuits, field programmable gate arrays or combinations of these (not shown) adapted to execute instructions. Host computer 1810 further comprises software 1811, which is stored in or accessible by host computer 1810 and executable by processing circuitry 1818. Software 1811 includes host application 1812. Host application 1812 may be operable to provide a service to a remote user, such as UE 1830 connecting via OTT connection 1850 terminating at UE 1830 and host computer 1810. In providing the service to the remote user, host application 1812 may provide user data which is transmitted using OTT connection 1850.

Communication system 1800 further includes base station 1820 provided in a telecommunication system and comprising hardware 1825 enabling it to communicate with host computer 1810 and with UE 1830. Hardware 1825 may include communication interface 1826 for setting up and maintaining a wired or wireless connection with an interface of a different communication device of communication system 1800, as well as radio interface 1827 for setting up and maintaining at least wireless connection 1870 with UE 1830 located in a coverage area (not shown in FIG. 18) served by base station 1820. Communication interface 1826 may be configured to facilitate connection 1860 to host computer 1810. Connection 1860 may be direct or it may pass through a core network (not shown in FIG. 18) of the telecommunication system and/or through one or more intermediate networks outside the telecommunication system. In the embodiment shown, hardware 1825 of base station 1820 further includes processing circuitry 1828, which may comprise one or more programmable processors, application-specific integrated circuits, field programmable gate arrays or combinations of these (not shown) adapted to execute instructions. Base station 1820 further has software 1821 stored internally or accessible via an external connection.

Communication system 1800 further includes UE 1830 already referred to. Its hardware 1835 may include radio interface 1837 configured to set up and maintain wireless connection 1870 with a base station serving a coverage area in which UE 1830 is currently located. Hardware 1835 of UE 1830 further includes processing circuitry 1838, which may comprise one or more programmable processors, application-specific integrated circuits, field programmable gate arrays or combinations of these (not shown) adapted to execute instructions. UE 1830 further comprises software 1831, which is stored in or accessible by UE 1830 and executable by processing circuitry 1838. Software 1831 includes client application 1832. Client application 1832 may be operable to provide a service to a human or non-human user via UE 1830, with the support of host computer 1810. In host computer 1810, an executing host application 1812 may communicate with the executing client application 1832 via OTT connection 1850 terminating at UE 1830 and host computer 1810. In providing the service to the user, client application 1832 may receive request data from host application 1812 and provide user data in response to the request data. OTT connection 1850 may transfer both the request data and the user data. Client application 1832 may interact with the user to generate the user data that it provides.

Figure 18:
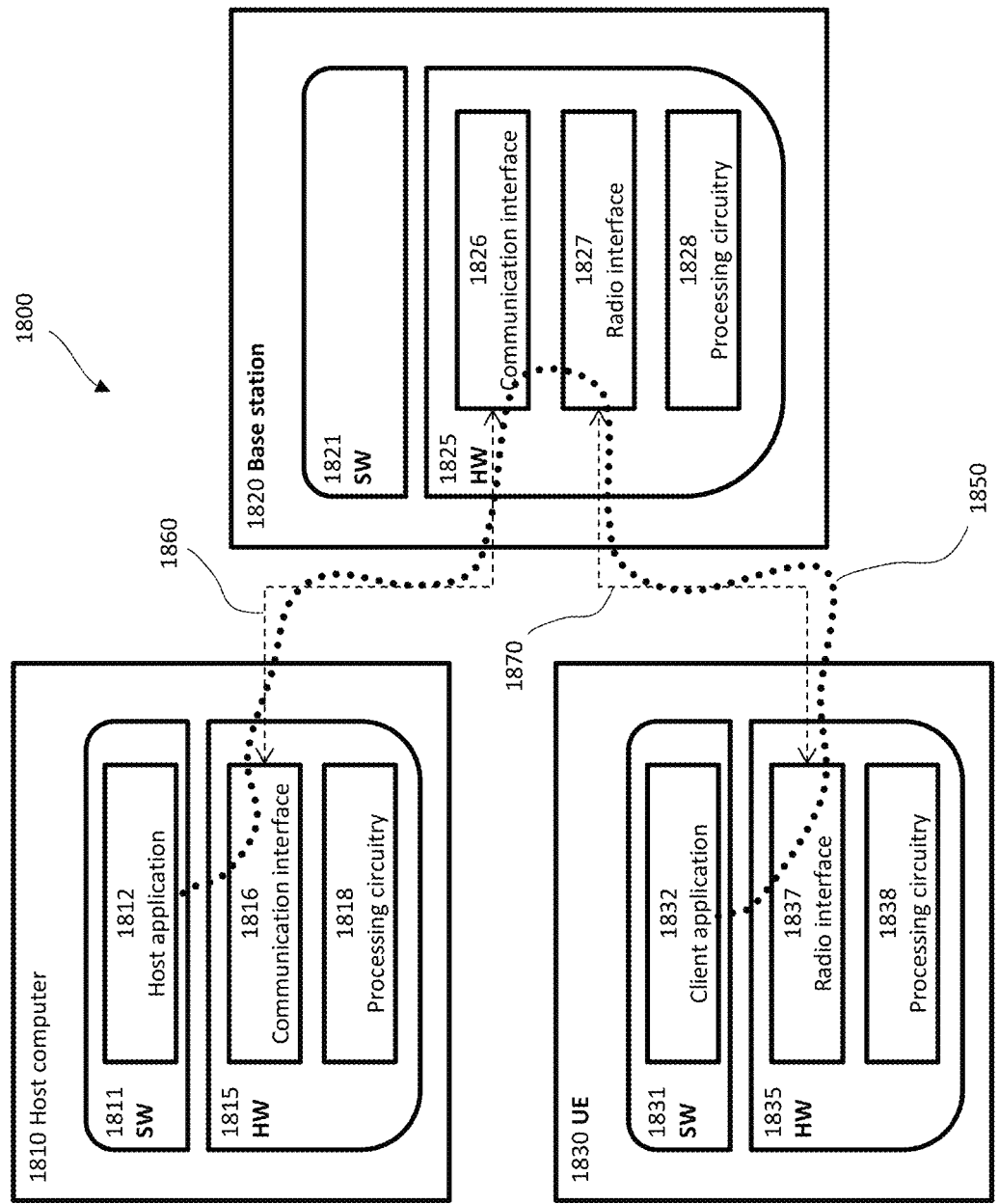
FIG. 18 is a graphical illustration of a host computer communicating via a base station with a user equipment over a partially wireless connection in accordance with some embodiments.

It is noted that host computer 1810, base station 1820 and UE 1830 illustrated in FIG. 18 may be similar or identical to host computer 2730, one of base stations 2712a, 2712b, 2712c and one of UEs 2791, 2792 of FIG. 27, respectively. This is to say, the inner workings of these entities may be as shown in FIG. 18 and independently, the surrounding network topology may be that of FIG. 27.

In FIG. 18, OTT connection 1850 has been drawn abstractly to illustrate the communication between host computer 1810 and UE 1830 via base station 1820, without explicit reference to any intermediary devices and the precise routing of messages via these devices. Network infrastructure may determine the routing, which it may be configured to hide from UE 1830 or from the service provider operating host computer 1810, or both. While OTT connection 1850 is active, the network infrastructure may further take decisions by which it dynamically changes the routing (e.g., on the basis of load balancing consideration or reconfiguration of the network).

Wireless connection 1870 between UE 1830 and base station 1820 is in accordance with the teachings of the embodiments described throughout this disclosure. One or more of the various embodiments improve the performance of OTT services provided to UE 1830 using OTT connection 1850, in which wireless connection 1870 forms the last segment. More precisely, the teachings of these embodiments may improve the data rate, among other things, and thereby provide benefits such as relaxed restrictions on file size/resolution and better responsiveness.

A measurement procedure may be provided for the purpose of monitoring data rate, latency and other factors on which the one or more embodiments improve. There may further be an optional network functionality for reconfiguring OTT connection 1850 between host computer 1810 and UE 1830, in response to variations in the measurement results. The measurement procedure and/or the network functionality for reconfiguring OTT connection 1850 may be implemented in software 1811 and hardware 1815 of host computer 1810 or in software 1831 and hardware 1835 of UE 1830, or both. In embodiments, sensors (not shown) may be deployed in or in association with communication devices through which OTT connection 1850 passes; the sensors may participate in the measurement procedure by supplying values of the monitored quantities exemplified above, or supplying values of other physical quantities from which software 1811, 1831 may compute or estimate the monitored quantities. The reconfiguring of OTT connection 1850 may include message format, retransmission settings, preferred routing etc.; the reconfiguring need not affect base station 1820, and it may be unknown or imperceptible to base station 1820. Such procedures and functionalities may be known and practiced in the art. In certain embodiments, measurements may involve proprietary UE signaling facilitating host computer 1810's measurements of throughput, propagation times, latency and the like. The measurements may be implemented in that software 1811 and 1831 causes messages to be transmitted, in particular empty or 'dummy' messages, using OTT connection 1850 while it monitors propagation times, errors etc.

Figure 19:
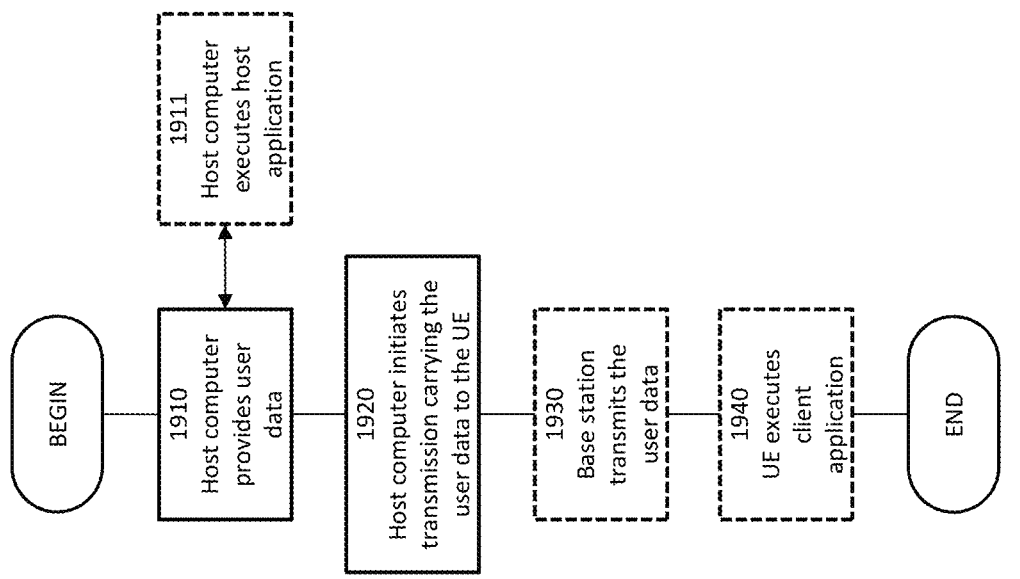
FIG. 19 is a flowchart illustrating a method implemented in a communication system including a host computer, a base station and a user equipment in accordance with some embodiments.

FIG. 19 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 19 will be included in this section. In step 1910, the host computer provides user data. In substep 1911 (which may be optional) of step 1910, the host computer provides the user data by executing a host application. In step 1920, the host computer initiates a transmission carrying the user data to the UE. In step 1930 (which may be optional), the base station transmits to the UE the user data which was carried in the transmission that the host computer initiated, in accordance with the teachings of the embodiments described throughout this disclosure. In step 1940 (which may also be optional), the UE executes a client application associated with the host application executed by the host computer.

Figure 20:
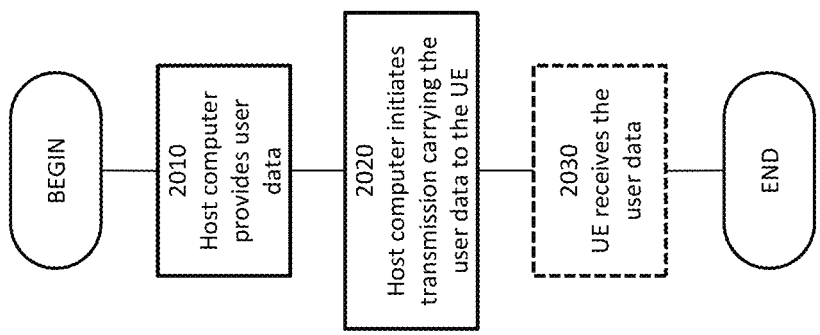
FIG. 20 is a flowchart illustrating another method implemented in a communication system including a host computer, a base station and a user equipment in accordance with some embodiments

FIG. 20 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 20 will be included in this section. In step 2010 of the method, the host computer provides user data. In an optional substep (not shown) the host computer provides the user data by executing a host application. In step 2020, the host computer initiates a transmission carrying the user data to the UE. The transmission may pass via the base station, in accordance with the teachings of the embodiments described throughout this disclosure. In step 2030 (which may be optional), the UE receives the user data carried in the transmission As described above, the exemplary embodiments provide both methods and corresponding apparatuses consisting of various modules providing functionality for performing the steps of the methods. The modules may be implemented as hardware (embodied in one or more chips including an integrated circuit such as an application specific integrated circuit), or may be implemented as software or firmware for execution by a processor. In particular, in the case of firmware or software, the exemplary embodiments can be provided as a computer program product including a computer-readable storage medium embodying computer program code (i.e., software or firmware) thereon for execution by the computer processor. The computer readable storage medium may be non-transitory (e.g., magnetic disks; optical disks; read only memory; flash memory devices; phase-change memory) or transitory (e.g., electrical, optical, acoustical or other forms of propagated signals-such as carrier waves, infrared signals, digital signals, etc.). The coupling of a processor and other components is typically through one or more busses or bridges (also termed bus controllers). The storage device and signals carrying digital traffic respectively represent one or more non-transitory or transitory computer readable storage medium. Thus, the storage device of a given electronic device typically stores code and/or data for execution on the set of one or more processors of that electronic device such as a controller.

Although the embodiments and its advantages have been described in detail, it should be understood that various changes, substitutions, and alterations can be made herein without departing from the spirit and scope thereof as defined by the appended claims. For example, many of the features and functions discussed above can be implemented in software, hardware, or firmware, or a combination thereof. Also, many of the features, functions, and steps of operating the same may be reordered, omitted, added, etc., and still fall within the broad scope of the various embodiments.

Abbreviations used in the preceding description include:
ACLR Adjacent channel leakage ratio
CACLR Cumulative adjacent channel leakage ratio
LBT Listen before talk
CA Carrier aggregation
BWP Bandwidth part
CC Component carrier
DCI Downlink control information
MAC-CE Medium access control layer control element
RRC Radio resource control
TB Transport block
TBS Transport block size

APPENDIX A

Title: Frame Structure for NR-U
3GPP Contribution Document for: Discussion, Decision
1 Introduction In this contribution we provide our view on frame structure for NR-U including issues related to NR-U transmission granularity, numerology, and wideband operation.

2 NR-U Transmission Granularity

During RAN1#92bis, the following agreement was made on Type-A and Type-B PxSCH mapping:

Agreement:
NR-U supports both Type-A and Type-B mapping already supported in NR
FFS: Additional starting positions and durations are not precluded In this section we address the FFS item. In 3GPP NR Rel-15 for licensed operation, downlink control information (DCI) is received over the physical layer downlink control channel (PDCCH). A PDCCH candidate is searched within a common or UE-specific search space which is mapped to a set of time and frequency resources referred to as a control resource set (CORESET). The search spaces within which PDCCH candidates must be monitored are configured to the UE via radio resource control (RRC) signalling. A monitoring periodicity is also configured for different PDCCH candidates. In any particular slot the UE may be configured to monitor multiple PDCCH candidates in multiple search spaces which may be mapped to one or more CORESETs. PDCCH candidates may need to be monitored multiple times in a slot, once every slot or once in multiple of slots. There are two kinds of transmission, i.e. Type A (slot-based) transmission and Type B (mini slot-based) transmission. In DL, Type B transmission could be started in any symbol with length of 2, 4 and 7 symbols. In UL, Type B transmission could be started in any symbol with any length between {2 and 14} symbols.

Observation 1—NR Rel15 supports DL and UL transmission starting in any symbol.

Observation 2—The periodicity of the starting point is controlled by the CORESET and search space RRC configuration. The monitoring periodicity is decoupled from the supported Type B transmission duration.

Proposal 1—No additional DL or UL starting positions are needed for NR-U

3 Numerology for NR-U

During RAN1#92bis, the following agreement was made on numerology:

Agreement:
For sub-7 GHz, NR-U study the SCSs, 15/30/60 kHz
Study performance difference between different SCS
Study if changes to UL design are needed to meet the PSD and OCB requirements
Study if an SS block design/RMSI/OSI with 60 kHz SCS is needed
Impact on MIB and SIB1 content
Need for use of ECP for 60 kHz
RACH design with 60 KHz SCS in addition to options currently part of NR
Other considerations are not precluded.
Impact on support of different BWs with different SCS and later during RAN1#94, the following additional agreement was made on numerology:

Agreement:
It is identified that being able to operate all DL signal/channels with the same numerology for a carrier and at least for intra-band CA on serving cells on unlicensed bands has at least the following benefits (at least for standalone operation, FFS whether this is benefit is realizable for inter-operator measurements)
Lower implementation complexity (e.g., a single FFT, no switching gaps)
Lower specification impact
No need for gaps for measurements on frequencies with a configured serving cell in unlicensed bands
It is identified that being able to operate all UL signal/channels with the same numerology for a carrier and at least for intra-band CA on serving cells on unlicensed bands has at least the following benefits
Lower implementation complexity (e.g., a single FFT, no switching gaps)
Lower specification impact
Common interlace structure
No need for gaps for transmission of SRS on a configured serving cell in unlicensed bands
FFS: PRACH benefits
FFS: same numerology for DL and UL considering switching gap In this section we address the study items in the first agreement taking into account that it has been identified as being beneficial to operate with a single numerology for all signals/channels in a particular link direction (DL or UL) as in the 2nd agreement. We argue that an attractive candidate for the single numerology is 30 kHz+NCP from both the standpoint of performance and the fact that this numerology is already supported in NR Rel-15. In contrast, adopting 60 kHz and potentially ECP requires quite a large number of specification changes while offering no significant performance benefits. In what follows, we discuss a number of aspects that are impacted by the choice of 30 kHz vs. 60 kHz.

3.1 Blind Detection of Numerology

Some companies suggest that both 30 kHz and 60 kHz designs for NR-U should be supported in specifications, and that the operator chooses which one to use based on the deployment scenario. This would mean that for standalone deployments, the operating band needs to be defined with both numerologies as candidates. The consequence is that since the UE is not aware of what numerology is used for SS/PBCH blocks, it needs to blindly detect the presence of SS/PBCH for each numerology candidate. We note that there are actually two components to numerology: (1) subcarrier spacing (30 vs. 60 kHz) and CP duration (NCP vs. ECP). In principle then, 3 candidates exist: 30 kHz+NCP, 60 kHz+NCP, and 60 kHz+ECP. Blind detection over this many candidates is unattractive from a UE complexity point of view, and for this reason, most NR operating bands (for licensed operation) are defined with a single numerology candidate. For full deployment flexibility for NR-U, including outdoor scenarios where delay spread can be significant, our view is that if only one candidate is allowed in a sub-7 GHz band, then it should be 30 kHz+NCP. This candidate is already supported in specifications today. The only other potential candidate considering all deployment scenarios is 60 kHz+ECP, and significant specification changes would be needed to support this.

Observation 3—Support of a single numerology per band in order to avoid UE blind detection in a stand-alone scenario implies that the numerology candidate (30 vs. 60 kHz SCS and NCP vs. ECP) needs to be chosen to maximize deployment flexibility.

3.2 Delay Spread and ECP

As mentioned in the previous section, delay spreads in outdoor deployments are typically significantly larger than in indoor scenarios. This places a lower bound on the CP duration that should be selected for such deployments. For 30 kHz, the NCP duration is approximately 2.35 us; for 60 kHz it is 1.17 us. For the latter, this means that the maximum differential delay between a direct path and a reflected path should be less than 1.17 us in order to maintain good performance. The RMS delay spread should be even less to ensure that this constraint is fulfilled in an average sense.

Based on field measurements at 5 GHz [1] in which the gNB is placed on the rooftop of a lowrise building and the UE is at ground level at varying distances of 90-200 m receiving reflections from nearby and distant buildings, RMS delay spreads up to 0.7 us have been observed depending on the UE location. Such a deployment is conceivable, for example, in an outdoor mall or urban square type setting. With this level of delay spread, it was observed that the instantaneous time delay easily exceeds the CP duration for 60 kHz SCS (1.17 us). In [1], it is shown that with this delay spread, the SINR (due to noise+ISI) drops to less than 15 dB, which can severely limit peak rates. Simulated link-level performance with delay spreads in the range of [100, 1000] ns has been evaluated based on the TDL-A channel [2]. From these results one can see that above 500 ns, 60 kHz SCS becomes unusable due to excessive ISI, unless ECP is adopted to enhance robustness against channel dispersion. However, based on the discussion in subsequent sections, adoption of ECP requires significant specification changes, and is thus not a preferred candidate. Based on the measurements and simulations referenced here, we observe the following:

Observation 4—30 kHz+NCP offers greater deployment flexibility than 60 kHz+NCP.

Observation 5—60 kHz+NCP breaks down for RMS delay spreads larger than 500 ns unless ECP is used to improve robustness against channel dispersion.

3.3 Channel Access Granularity

The transmission granularity can be increased, and latency can be reduced, if either 30 kHz or 60 kHz subcarrier spacing is used for NR-U compared to the baseline of 15 kHz. While 60 kHz potentially provides better access granularity for Type A PDSCH/PUSCH mapping, this is counteracted by the fact that the spectrum utilization in case of 20 MHz using 60 kHz SCS is lower than 30 kHz due to larger guard bands. Moreover, the use of Type B PDSCH/PUSCH mapping (mini-slots) for 30 kHz offers very high granularity already.

Here, we evaluate the performance difference between 15, 30, and 60 kHz in two scenarios both based on the indoor evaluation scenario agreed for NR-U evaluations:

Single NR-U operator

NR-U operator coexisting with a Wi-Fi operator.

Note that for the single operator case, it is assumed that one of the operator does not serve any traffic. For UL, self-scheduling is assumed, i.e. the grant is also sent on the unlicensed carrier. It is also assumed that only slot-based (Type A) scheduling is used for the uplink. For DL, Type B scheduling starting at any symbol is enabled. We believe that the highest UL performance difference between different SCS can be observed in this case. Finally, UE capability #1 processing delays are modeled. We analyzed the mean UL/DL object data rate per UE for 12, 35 and 55% buffer occupancy that represent low, medium and high load using different SCS 1) in a single NR-U indoor network deployment and 2) when NR-U coexists with another Wi-Fi network in an indoor deployment.

For the DL, no large differences in performance between 15, 30, 60 kHz were evident, which is expected since Type B PDSCH mapping is used with PDCCH monitoring every OFDM symbol. In fact, as the SCS increases, the performance degrades to some extent due to larger overhead and larger guard bands. For the UL on the other hand, both scenarios (single NR-U operator or coexisting with Wi-Fi) show that both 30 and 60 kHz perform better than 15 kHz subcarrier spacing. However, minimal difference is observed between 30 and 60 kHz subcarrier spacing due to the trade-off between channel access granularity and spectrum utilization. Most of the gain comes from increasing the SCS from 15 kHz to 30 kHz.

Observation 6—The largest performance gain is achieve by increasing the SCS from 15 kHz to 30 kHz. Diminishing returns (or even declining returns in DL) are achieved by increasing further from 30 kHz to 60 kHz.

3.4 Specification Impact

As demonstrated above, 60 kHz does not offer an appreciable gain in performance compared to 30 kHz considering channel access granularity, and can lead to performance degradation in larger delay spread scenarios without ECP. In addition, 60 kHz has significantly larger spec impact than 30 kHz as can be seen in the following table.

TABLE 1

Specification impact comparison of 15/30 KHz vs. 60 kHz SCS

| Item | 15/30 kHz SCS | 60 kHz SCS |
| --- | --- | --- |
| UL Interlace Design | PRB-based agreed | May require sub-PRB interlacing to achieve power boosting gains. Sub-PRB operation has at least the following spec impact: Reference signal design (e.g., DMRS, CSI-RS, SRS, etc.) Channel estimation aspects Resource allocation |
| NR-U DRS Design | SSB/PBCH design already supported FDM multiplexing of SIB1 and SS/PBCH blocks possible | SSB/PBCH block time domain pattern not supported in Rel-15 SSB/PBCH block—CORESET configuration tables (38.213, Section 13) not supported in Rel-15 FDM multiplexing of SIB1 and SS/PBCH blocks not possible (initial BWP limited to 24 PRBs; SS/PBCH blocks bandwidth is 20 PRBs) |
| ECP Support | Not needed | SSB/PBCH block time domain patterns not supported for ECP in Rel-15 ECP beneficial for RMS delay spreads greater than 500 ns |
| RRC signaling of SCS for SS/PBCH and PRACH numerologies for NSA operation | Signaling already supported | Signaling of 60 KHz not supported for FR1 in Rel-15 |
| PBCH signaling of SCS for Msg 2/4 and SI for NSA operation | Signaling already supported | Signaling of 60 kHz not supported for FR1 in Rel-15 |
| Extension of PDSCH-to-HARQ timing values in DCI to indicate timing up to largest COT allowed by regulation | Extension to 5 bits is beneficial | Extension to 6 bits beneficial |
| Possible extension of the number of HARQ IDs to fully exploit the largest COT without gaps allowed by regulation | No extension required | Extension to more than 16 may be needed (24 slots in a 6 ms COT) |

Proposal 2—Due to considerations of deployment flexibility, performance, and minimized spec impact, 30 kHz+ NCP is prioritized for NR-U PHY layer channel design and PHY layer procedure design.

Since the agreement above concludes "For sub-7 GHz NR-U, study the SCSs 15/30/60 kHz," including specification impact, it is proposed here that the specification impact be captured in the TR 38.889. We include a text proposal for the TR in [3].

Proposal 3—Capture the specification impact of supporting different numerology candidates for FR1 operation for NR-U in TR 38.889. A TP is included in [3].

4 Wideband Operation

In RAN1#92b, the following agreement was made:
Agreement:
Study possible enhancements for HARQ operation
Study changes needed for Configured Grant support in NR-U
Baseline for study: If absence of Wi-Fi cannot be guaranteed (e.g. by regulation)
in the band (sub-7 GHz) where NR-U is operating, the NR-U operating bandwidth is an integer multiple of 20 MHz
At least for band where absence of Wi-Fi cannot be guaranteed (e.g. by regulation), LBT can be performed in units of 20 MHz.
FFS: details on how to perform LBT for as single carrier with bandwidth greater than 20 MHz, i.e., integer multiples of 20 MHz.

In this section we address the FFS item by considering the details of how to perform LBT for wideband operation for both CA-based operation and single wideband carrier operation. In the latter, we assume that the carrier bandwidth is greater than 20 MHz and we focus on two primary options: subband LBT (units of 20 MHz) vs. wideband LBT (LBT on full BWP).

As for NR in licensed bands, it is expected that NR-U will support transmissions over a wide bandwidth (>>20 MHz). In NR Rel-15 there are two modes of operation to support wideband transmissions:
Mode 1: Carrier aggregation (CA)-based wideband operation analogous to LTE-eLAA
Mode 2: Single wideband carrier operation based on a single active bandwidth part (BWP)

Figure 10:
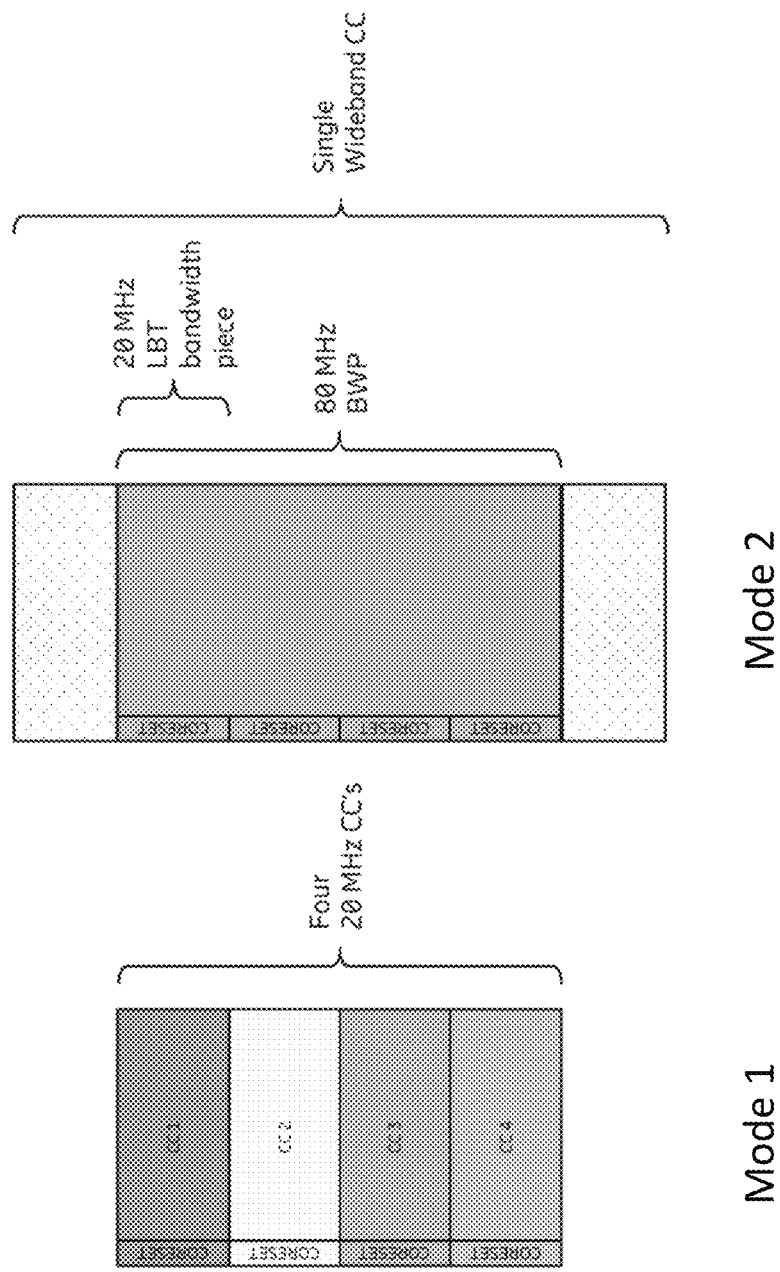
FIG. 10 is a diagram illustrating two modes of NR wideband operation.

FIG. 10 shows an example of these two operation modes for an operating bandwidth of 80 MHz. For Mode 1, the UE is configured with four component carriers (CC's) totalling 80 MHz which are activated prior to reception/transmission. As per the above RAN1 agreement, LBT can be performed in units of 20 MHz for Mode 1. Hence, it makes sense to configure the individual CC's with a bandwidth of 20 MHz such that the CC bandwidth and the LBT bandwidth are one and the same. For Mode 2, on the other hand, the UE is configured with a single 80 MHz bandwidth part (BWP) which is assumed activated prior to reception/transmission. As shown in the diagram, the wideband carrier (CC) may be greater than 80 MHz; the BWP is simply the part of this wideband carrier for which the UE is configured for transmission/reception. For this Mode it is still FFS on how to perform LBT.

One claimed drawback of Mode 1 is that each CC has a guard band defined by RAN4 which reduces the spectral utilization efficiency compared to Mode 2 for the case when transmission occurs over the full BWP. However, from RAN4 perspective there is no requirement that the guard bands between two or more contiguous carriers are left empty. Hence, optimizations may be considered whereby the transmitting device uses the guard REs and the receiving device assumes that PxSCH is mapped to these REs.

Proposal 4—For CA-based wideband operation in NR-U, it is beneficial to utilize the guard bands between two or more contiguous CCs for PxSCH reception (x=D for downlink and =U for uplink).

For Mode 2, as per the above agreement, it is FFS on how to perform LBT. Two possible approaches considered here are: (1) sub-band LBT where LBT is performed in units of 20 MHz, and (2) wideband LBT where LBT is performed over the full bandwidth of the BWP. In the latter, transmission only occurs if the entire BWP is sensed as unoccupied.

4.1 Sub-Band LBT

For sub-band LBT, we introduce the terminology "LBT bandwidth piece" which according to above agreement is 20 MHz wide. As shown in FIG. 3, the 80 MHz BWP consists of 4 LBT bandwidth pieces. In principle, if an LBT bandwidth piece is sensed as unoccupied, then transmission may occur in that LBT bandwidth piece. However, there are several important aspects that need to be considered before this type of operation could be enabled.

4.1.1 CORESET Configuration

As shown in FIG. 3, separate CORESETs and search spaces need to be configured for different LBT bandwidth pieces to ensure the availability of control signalling when at least one LBT bandwidth piece is available for PDSCH transmission. It is undesirable to configure a wide CORESET across LBT bandwidth pieces, since if LBT fails on one of the pieces, the PDCCH would need to be punctured in that LBT bandwidth piece, degrading the control channel reliability. Hence, in both Mode-1 and Mode-2 are identical in terms of total number of required CORESETs. We do note however, that NR Rel-15 sets a limit on the maximum number of CORESETs per CC. Hence, Mode 2 will ultimately run into difficulties as the bandwidth of the BWP increases.

Observation 7—Single wideband carrier operation (Mode-2) requires the same total number of CORESETs to be configured as CA-based operation (Mode-1) when considering the same bandwidth. Limitations on the number of CORESETs per CC may pose scaling problems for Mode-2.

4.1.2 Puncturing/Rate Matching

In NR, a series of transport block (TB) processing steps are required before a PxSCH transmission can occur on the physical channel. The steps include transport block size (TBS) determination, followed by possible segmentation of the TB into one or more codeblocks or codeblock groups, data encoding, CRC attachment, modulation, layer mapping, and precoding. These steps take time, and thus must be performed in advance of the slot scheduled for PxSCH transmission. Moreover, since LBT procedures are performed just in advance of the scheduled slot, some or all of the TB processing steps must be performed in advance of the LBT procedure as well. Consequently, during TB processing for Mode 2 operation, the transmitting device (gNB or UE) would need to assume that all LBT bandwidth pieces are available for transmission since there is little or no time for TB re-processing to account for one or more LBT bandwidth pieces being unavailable due to LBT failure. It gets more complicated in the UL since the scheduling information is already provided by the gNB via the grant, and the UE does not have the flexibility to adjust it. This is in contrast to Mode 1 operation where separate TB processing is performed on a per-CC basis, and if one or more CC's is unavailable for transmission, the TB(s) in other CC's do not need to be re-processed.

For Mode-2, one way to handle such timing constraints, thus avoiding fully re-processing the TB, is for the transmitting device to puncture or rate-match around the LBT bandwidth pieces that are unavailable due to LBT failure. In the former, the PDSCH REs are simply not transmitted in those LBT bandwidth pieces, and the UE may simply set the soft values for the coded bits corresponding to those REs to zero prior to a decoding. In the latter, partial re-processing may be performed at the transmitting device, assuming sufficient processing capability. The partial re-processing is to re-encode the TB at a higher rate accounting for the unavailable REs. Both approaches are undesirable and may cause reliability issues.

Figure 11:
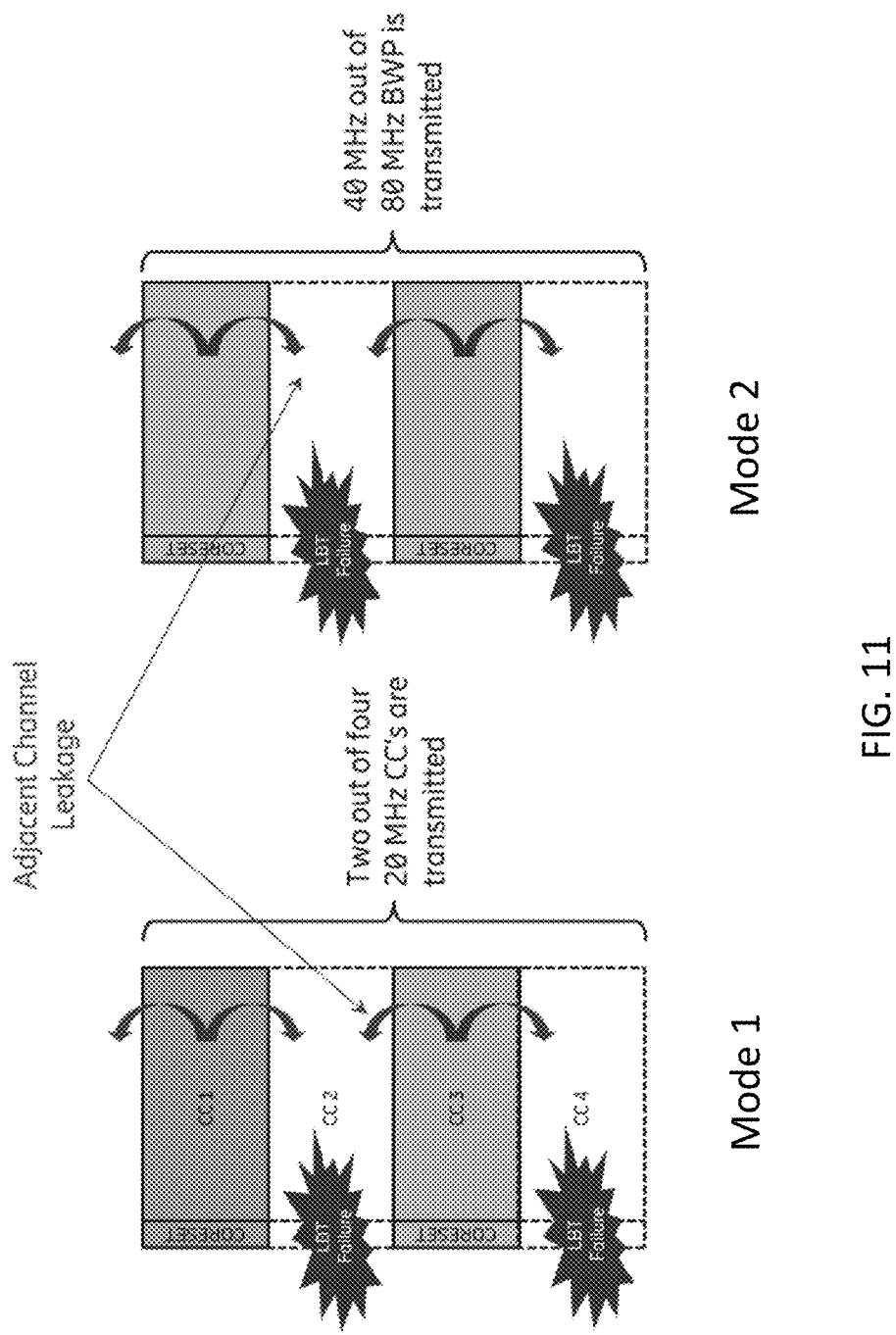
FIG. 11 is a diagram illustrating an example of an outcome of LBT where LBT fails in two modes of NR wideband operation.
Figure 12:
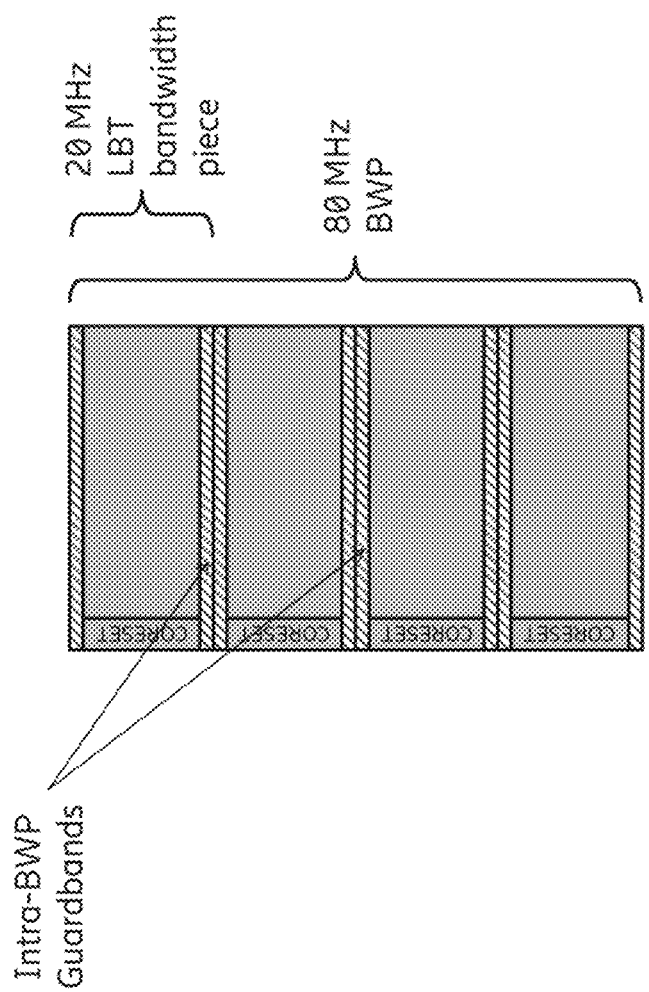
FIG. 12 is a diagram illustrating intra-BWP guard bands on either side of each of a plurality of LBT bandwidth pieces.

Observation 8—Puncturing/rate matching around LBT bandwidth pieces that fail LBT may cause PxSCH decoding failure 4.1.3 Intra-BWP Guard Bands As discussed further in [4], transmission only in the "free" LBT bandwidth pieces for Mode-2 can cause RF leakage into adjacent 20 MHz LBT bandwidth pieces that fail LBT as illustrated in FIG. 11. Such leakage occurs also in the case of CA-based operation (Mode-1). However, in CA-based operation, guard bands are already defined in order to control cumulative ACLR for gaps between CCs as in LTE-LAA [5] (Section 6.6.2.2). For Mode-2, however, there is no notion of an in-channel guard band for intra-BWP gaps due to LBT failure. Our understanding is that defining such guard bands will require significant new RAN4 specification effort. Furthermore, RAN1 will need to consider puncturing/rate matching around the guard bands.

Observation 9—Introduction of intra-BWP guard bands to control adjacent channel leakage into LBT bandwidth pieces that fail LBT may require significant RAN4 specification effort Based on this discussion we propose to send an LS to RAN4 requesting whether or not intra-BWP guard bands are needed and if so, the feasibility of developing adjacent channel leakage requirements within a BWP. A draft LS is included in [6].

Proposal 5—Send an LS to RAN4 requesting whether or not intra-BWP guard bands are needed for wideband carrier operation where a BWP spans multiple LBT bandwidth pieces. A draft LS in included in [6].

4.2 Wideband LBT

As mentioned previously, for wideband LBT, the channel is sensed over the entire BWP. Based on this, transmission occurs over the entire BWP if LBT is successful, or not at all if LBT fails. In contrast to sub-band LBT, wideband LBT avoids the puncturing/rate matching issues and the guard band issues mentioned in the prior two sections, thus avoiding many RAN1 and RAN4 specification changes. We point out that such specification changes would end up making single-wideband carrier transmission with sub-band LBT very similar to CA-based operation anyway. It seems entirely unnecessary to re-invent the wheel. Based on this, we propose the following Proposal 6 NR-U supports CA-based wideband carrier operation (Mode-1) with carrier bandwidth equal to the LBT bandwidth.

Proposal 7 NR-U supports single wideband carrier operation (Mode-2) with wideband LBT only, and not sub-band LBT.

4.3 Active Bandwidth Parts

In NR Rel-15, a UE can be pre-configured with multiple BWPs, and the active BWP can be switched dynamically amongst them. However, at any given time, a UE is limited to only a single active BWP. BWP switching can be controlled by several means: by DCI indicating a downlink assignment/uplink grant, by the bwp-InactivityTimer, by RRC signalling, or by the MAC entity itself upon initiation of Random Access procedure. Some companies propose that support for multiple active BWPs should be added for NR-U. In principle, this is not much different from carrier aggregation, except it adds extra complications and overhead for the L1 signaling. If the intention is to configure the BWP bandwidth to be equal to the LBT bandwidth such that an LBT failure on one BWP does not impact the reliability of the transmission on another BWP, then the latter can be more easily achieved with CA-based operation without additional spec impact.

Proposal 8—Multiple active BWPs are not considered for NR-U.

5 Conclusion

In this paper we made the following observations:

Observation 1—symbol.

NR Rel15 supports DL and UL transmission starting in any

Observation 2—The periodicity of the starting point is controlled by the CORESET and search space RRC configuration. The monitoring periodicity is decoupled from the supported Type B transmission duration.

Observation 3—Support of a single numerology per band in order to avoid UE blind detection in a stand-alone scenario implies that the numerology candidate (30 vs. 60 kHz SCS and NCP vs. ECP) needs to be chosen to maximize deployment flexibility.

Observation 4—30 kHz+NCP offers greater deployment flexibility than 60 kHz+NCP.

Observation 5—60 kHz+NCP breaks down for RMS delay spreads larger than 500 ns unless ECP is used to improve robustness against channel dispersion.

Observation 6—The largest performance gain is achieve by increasing the SCS from 15 kHz to 30 kHz. Diminishing returns (or even declining returns in DL) are achieved by increasing further from 30 kHz to 60 kHz.

Observation 7—Single wideband carrier operation (Mode-2) requires the same total number of CORESETs to be configured as CA-based operation (Mode-1) when considering the same bandwidth. Limitations on the number of CORESETs per CC may pose scaling problems for Mode-2.

Observation 8—Puncturing/rate matching around LBT bandwidth pieces that fail LBT may cause PxSCH decoding failure Observation 9—Introduction of intra-BWP guard bands to control adjacent channel leakage into LBT bandwidth pieces that fail LBT may require significant RAN4 specification effort Based on the discussion in this paper we propose the following:

Proposal 1—No additional DL or UL starting positions are needed for NR-U

Proposal 2—Due to considerations of deployment flexibility, performance, and minimized spec impact, 30 kHz+ NCP is prioritized for NR-U PHY layer channel design and PHY layer procedure design.

Proposal 3—Capture the specification impact of supporting different numerology candidates for FR1 operation for NR-U in TR 38.889. A TP is included in [3].

Proposal 4—For CA-based wideband operation in NR-U, it is beneficial to utilize the guard bands between two or more contiguous CCs for PxSCH reception (x=D for downlink and =U for uplink).

Proposal 5—Send an LS to RAN4 requesting whether or not intra-BWP guard bands are needed for wideband carrier operation where a BWP spans multiple LBT bandwidth pieces. A draft LS in included in [6].

Proposal 6—NR-U supports CA-based wideband carrier operation (Mode-1) with carrier bandwidth equal to the LBT bandwidth.

Proposal 7—NR-U supports single wideband carrier operation (Mode-2) with wideband LBT only, and not sub-band LBT.

Proposal 8—Multiple active BWPs are not considered for NR-U.

REFERENCES

[1] A. Simonson, H. Asplund, J. Medbo, and K. Werner, "Beamforming impact on time dispersion assessed on measured channels," IEEE Vehicular Technology Conference, Porto, Portugal, June 2018.
[2] R1-164621
[3] R1-1811309
[4] R1-1811307
[5] 3GPP TS 36.104, "Base station radio transmission and reception," v15.3.0, June 2018.
[6] R1-1811308

The invention claimed is:

1. A method of receiving or transmitting, in a first node operable in a wireless communication network, a data transmission over unlicensed spectrum, comprising:
    receiving, from a second node, a control message allocating a plurality of radio resources in a bandwidth part for use in at least one data channel, wherein the bandwidth part is divided into a plurality of bandwidth pieces;
    receiving or transmitting, from or to the second node, the data transmission using radio resources corresponding to at least one of the plurality of bandwidth pieces; and
    wherein the radio resources used to receive or transmit the data transmission exclude one or more radio resources that map to at least a portion of at least one guard band located between two bandwidth pieces,
    wherein during a first portion of a time period in which the data transmission is received or transmitted the radio resources used to receive or transmit the data transmission exclude one or more radio resources mapping to at least a portion of a guard band located between two bandwidth pieces that are contiguous and that are determined to be available by a listen-before-talk (LBT) procedure for data transmission, and wherein during a second portion of the time period the radio resources used to receive the data transmission include the one or more radio resources mapping to the at least a portion of the guard band located between two bandwidth pieces that are contiguous and that are determined to be available by an LBT procedure for data transmission.

2. The method of claim 1, wherein when the data transmission is transmitted to the second node, the first node performs a listen-before-talk (LBT) procedure on each of the plurality of bandwidth pieces to determine whether the bandwidth piece is available for data transmission.

3. The method of claim 1, wherein the radio resources used to receive or transmit the data transmission include one or more radio resources mapping to at least a portion of a guard band located between two bandwidth pieces that are contiguous and that are determined to be available by a listen-before-talk (LBT) procedure for data transmission.

4. The method of claim 1, further comprising:
determining, by the first node, that a frequency-contiguous block of one or more bandwidth pieces is to be used for reception or transmission of the data transmission; and
determining, by the first node, that among the radio resources mapping to the frequency-contiguous block only one or more radio resources mapping to guard bands at the edges of the frequency-contiguous block are excluded from being used to receive or transmit the data transmission.

5. The method of claim 4, wherein the control message includes an indication that the frequency-contiguous block of one or more bandwidth pieces is determined to be available by a listen-before-talk (LBT) procedure and is to be used for reception or transmission of the data transmission and wherein the determining, by the first node, that only one or more radio resources mapping to guard bands at the edges of the frequency-contiguous block are excluded from being used to receive or transmit the data transmission is based at least partially on the indication.

6. The method of claim 5, wherein, when the data transmission is received from the second node, the determining, by the first node, that only one or more radio resources mapping to guard bands at the edges of the frequency-contiguous block are excluded from being used to receive the data transmission, is based at least partially on an implicit indication from the second node.

7. The method of claim 5, wherein, when the data transmission is transmitted to the second node, the second node determines that only one or more radio resources mapping to guard bands at the edges of the frequency-contiguous block are excluded from being used to receive the data transmission from the first node based at least partially on an implicit indication from the first node.

8. The method of claim 1, wherein a duration of the first portion of the time period is predetermined.

9. The method of claim 1, wherein a duration of the first portion of the time period is indicated to the first node in a control message received prior to receipt of the data transmission.

10. The method of claim 1, wherein receiving or transmitting of the data transmission is one of punctured or rate-matched to exclude use of the one or more radio resources mapping to the at least a portion of the at least one guard band during the first portion of the time period, and
wherein the data transmission is scheduled to exclude use of the one or more radio resources corresponding to the at least a portion of the at least one guard band during the second portion of the time period.

11. The method of claim 1, further comprising:
receiving, prior to receipt or transmission of the data transmission, a control message indicating to the first node the at least one guard band or portion thereof corresponding to the one or more radio resources that are excluded from use for the data transmission.

12. The method of claim 11, wherein the control message indicating the at least one guard band or portion thereof is included as part of the control message allocating a plurality of radio resources in a bandwidth part.

13. The method of claim 11, wherein the control message indicating the at least one guard band or portion thereof includes one or more bits, each of the one or more bits corresponding to at least one of a plurality of guard bands located between the bandwidth pieces and indicating to the first node whether at least one or more radio resources that map to the corresponding at least one guard band are excluded from use for the data transmission.

14. The method of claim 13, wherein at least one of the one or more bits corresponds to multiple ones of the plurality of guard bands.

* * * * *